US011663831B2

(12) United States Patent
Mihara et al.

(10) Patent No.: US 11,663,831 B2
(45) Date of Patent: May 30, 2023

(54) IMAGE PROCESSING DEVICE AND IMAGE PROCESSING METHOD

(71) Applicant: SONY CORPORATION, Tokyo (JP)

(72) Inventors: Hajime Mihara, Kanagawa (JP); Shun Kaizu, Kanagawa (JP); Teppei Kurita, Tokyo (JP); Yuhi Kondo, Tokyo (JP); Yasutaka Hirasawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 16/770,908

(22) PCT Filed: Oct. 12, 2018

(86) PCT No.: PCT/JP2018/038079
§ 371 (c)(1),
(2) Date: Jun. 8, 2020

(87) PCT Pub. No.: WO2019/123795
PCT Pub. Date: Jun. 27, 2019

(65) Prior Publication Data
US 2021/0174127 A1 Jun. 10, 2021

(30) Foreign Application Priority Data
Dec. 21, 2017 (JP) .............................. JP2017-244982

(51) Int. Cl.
G06K 9/46 (2006.01)
G06V 10/60 (2022.01)
(Continued)

(52) U.S. Cl.
CPC .............. *G06V 10/60* (2022.01); *G06V 10/10* (2022.01); *G06V 10/145* (2022.01);
(Continued)

(58) Field of Classification Search
CPC ...... A63F 13/327; A63F 13/213; A63F 13/25; A63F 13/32; A63F 13/332; A63F 13/335;
(Continued)

(56) References Cited

U.S. PATENT DOCUMENTS 10,805,528 B2 * 10/2020 Ohba ........................ G06T 1/00
2007/0222781 A1   9/2007 Kondo et al.
(Continued)

FOREIGN PATENT DOCUMENTS

CN    101044507 A    9/2007
CN    102047651 A    5/2011
(Continued)

OTHER PUBLICATIONS

Katsushi et al., "Basic Theory of Polarization and Its Applications", 2008 Information Processing Society of Japan, vol. 1, No. 1, Jun. 2008, pp. 64-72.
(Continued)

*Primary Examiner* — Duy M Dang
(74) *Attorney, Agent, or Firm* — Chip Law Group

(57) ABSTRACT

A polarized image acquisition section 11a acquires a polarized image of a target object having one or more polarization directions. A polarization parameter acquisition section 12-1 calculates the average brightness α of a polarization model on the basis of a non-polarized image subjected to sensitivity correction. Further, the polarization parameter acquisition section 12-1 calculates the amplitude β of the polarization model on the basis of the calculated average brightness α, pre-stored information regarding the zenith angle θ of the normal line of the target object, a refractive index r, and reflectance property information indicative of whether a subject is diffuse reflection or specular reflection. A polarization model detection section 13-1 is able to detect the polarization properties of the target object through the use of
(Continued)

an image polarized in one or more polarization directions, by calculating the phase ϕ of the polarization model on the basis of a polarized image of the target object having one or more polarization directions, the average brightness α, and the amplitude β of the polarization model.

18 Claims, 22 Drawing Sheets

(51) Int. Cl.
　　　*G06V 10/56*　　　(2022.01)
　　　*G06V 10/145*　　(2022.01)
　　　*G06V 10/147*　　(2022.01)
　　　*G06V 10/10*　　　(2022.01)
　　　*G06V 10/30*　　　(2022.01)
(52) U.S. Cl.
　　　CPC ............ *G06V 10/147* (2022.01); *G06V 10/30* (2022.01); *G06V 10/56* (2022.01)
(58) Field of Classification Search
　　　CPC .......... A63F 13/655; A63F 13/00; G06T 7/55; G06T 3/0068; G06T 15/04; G06T 7/001; G06T 7/593; G06T 7/85; G06T 7/73; G06T 2207/10024; G06T 11/40; G06T 2207/20228; G06T 2207/30201; G06T 2207/10021; G06T 11/00; G06K 9/00228; G06K 9/6202; G06K 9/6279; G06K 9/0063; G01S 13/90; G01S 17/89; H04N 13/128; H04N 13/194; H04N 2013/0081; H04N 13/243; G06F 3/013; G01J 4/04; G01N 21/21; G06V 10/10; G06V 10/145; G06V 10/147; G06V 10/30; G06V 10/60; G06V 10/56
　　　See application file for complete search history.

(56) References Cited

U.S. PATENT DOCUMENTS

| | | | |
|---|---|---|---|
| 2008/0049224 | A1 | 2/2008 | Otsuki et al. |
| 2009/0141027 | A1 | 6/2009 | Sato |
| 2013/0136306 | A1 | 5/2013 | Li et al. |
| 2013/0202214 | A1 | 8/2013 | Robles-Kelly et al. |
| 2016/0275362 | A1 | 9/2016 | Aoki et al. |
| 2017/0231484 | A1 | 8/2017 | Komine |
| 2018/0308217 | A1* | 10/2018 | Kurita ................... G06T 3/40 |

FOREIGN PATENT DOCUMENTS

| | | |
|---|---|---|
| CN | 102809431 A | 12/2012 |
| CN | 103080978 A | 5/2013 |
| CN | 105989360 A | 10/2016 |
| EP | 2889806 A2 | 7/2015 |
| EP | 3070457 A1 | 9/2016 |
| JP | 2007-139751 A | 6/2007 |
| JP | 3955616 B2 | 8/2007 |
| JP | 3955616 B2 | 11/2007 |
| JP | 2009-042040 A | 2/2009 |
| JP | 2012-033149 A | 2/2012 |
| JP | 2015-128228 A | 7/2015 |
| JP | 2016-124964 A | 7/2016 |
| JP | 2016-177686 A | 10/2016 |
| JP | 2017-228983 A | 12/2017 |
| KR | 10-2013-0040964 A | 4/2013 |
| KR | 10-2016-0112958 A | 9/2016 |
| WO | 2007/029446 A1 | 3/2007 |
| WO | 2008/099589 A1 | 8/2008 |
| WO | 2011/130793 A1 | 10/2011 |
| WO | 2012/002552 A1 | 1/2012 |

OTHER PUBLICATIONS

Office Action for JP Patent Application No. 2019-560824, dated May 24, 2022, 03 pages of English Translation and 03 pages of Office Action.

Atkinson, et al., "Recovery of Surface Orientation From Diffuse Polarization", IEEE Transactions on Image Processing, vol. 15, No. 6, Jun. 2006, pp. 1653-1664.

Miyazaki, et al., "Basic Theory of Polarization and Its Applications", vol. 1 No. 1, Jun. 2008, pp. 64-72.

Miyazaki, et al., "Transparent Surface Modeling from a pair of Polarization Images", IEEE Transactions on Pattern Analysis and Machine Intelligence, vol. 28, No. 1, Jan. 2004, pp. 73-82.

Daisuke, et al., "Transparent Surface Modeling from a Pair of Polarization Images" IEEE Transactions on Pattern Analysis and Machine Intelligence, vol. 26, No. 1, Jan. 2004, pp. 73-82.

Katsushi et al., "Basic Theory of Polarization and Its Applications", Information Processing Society of Japan, vol. 1, No. 1, Jun. 2008, pp. 64-72.

International Search Report and Written Opinion of PCT Application No. PCT/JP2018/038079, dated Jan. 8, 2019, 09 pages of ISRWO.

\* cited by examiner

FIG. 3

| | KNOWN INFORMATION | UNKNOWN PARAMETER |
|---|---|---|
| PATTERN 1 | • POLARIZED IMAGE (ONE OR MORE POLARIZATION DIRECTIONS)<br>• NON-POLARIZED IMAGE (AVERAGE BRIGHTNESS α)<br>• AMPLITUDE β | PHASE φ |
| PATTERN 2 | • POLARIZED IMAGE (ONE OR MORE POLARIZATION DIRECTIONS)<br>• NON-POLARIZED IMAGE (AVERAGE BRIGHTNESS α)<br>• PHASE φ | AMPLITUDE β |
| PATTERN 3 | • POLARIZED IMAGE (TWO OR MORE POLARIZATION DIRECTIONS)<br>• NON-POLARIZED IMAGE (AVERAGE BRIGHTNESS α) | PHASE φ<br>AMPLITUDE β |
| PATTERN 4 | • POLARIZED IMAGE (TWO OR MORE POLARIZATION DIRECTIONS)<br>• PHASE φ | AVERAGE BRIGHTNESS α<br>AMPLITUDE β |

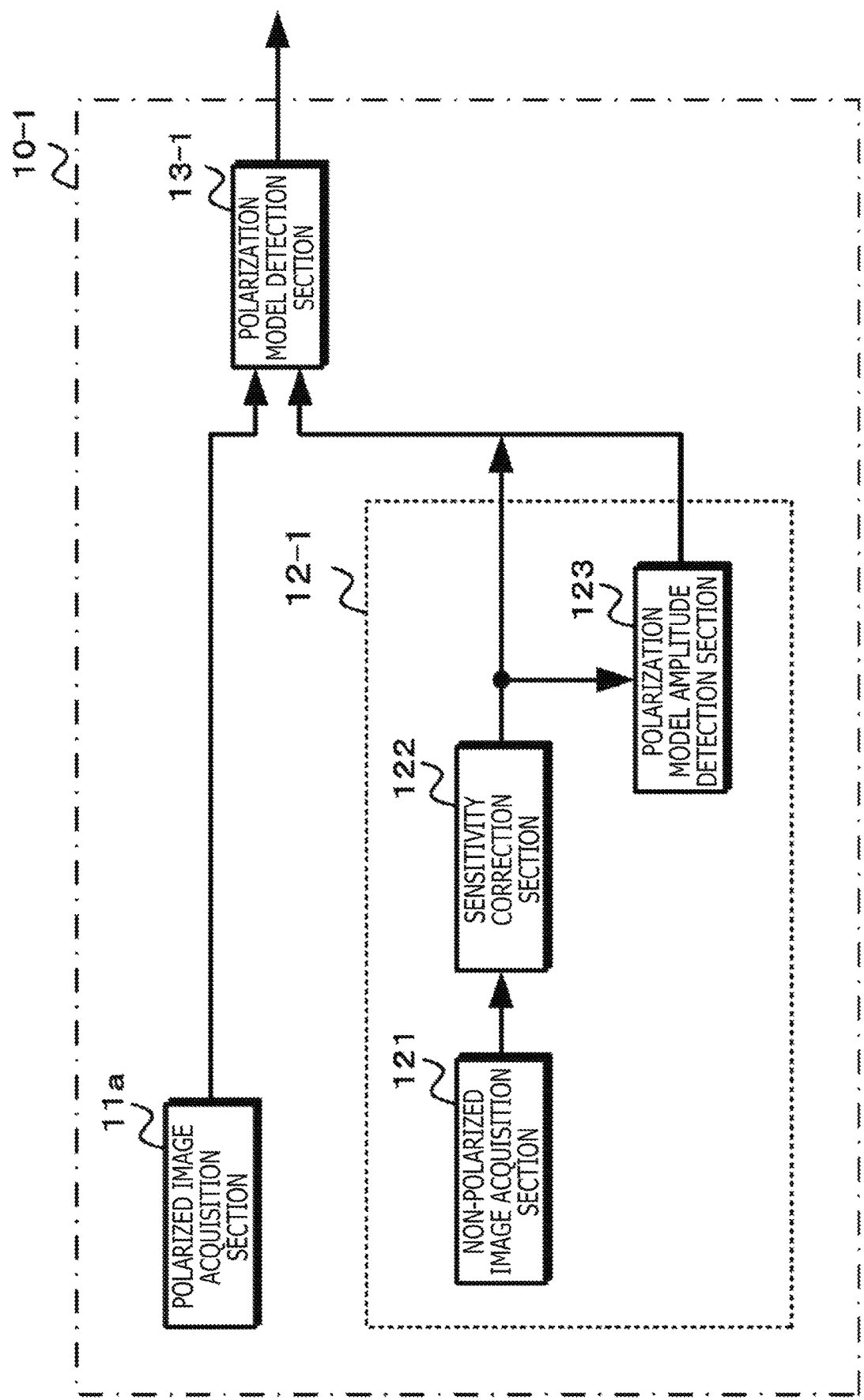

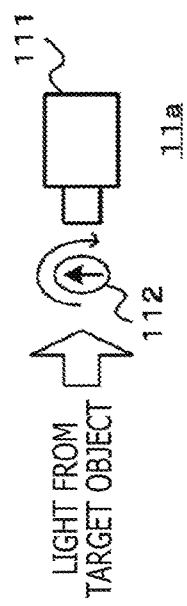
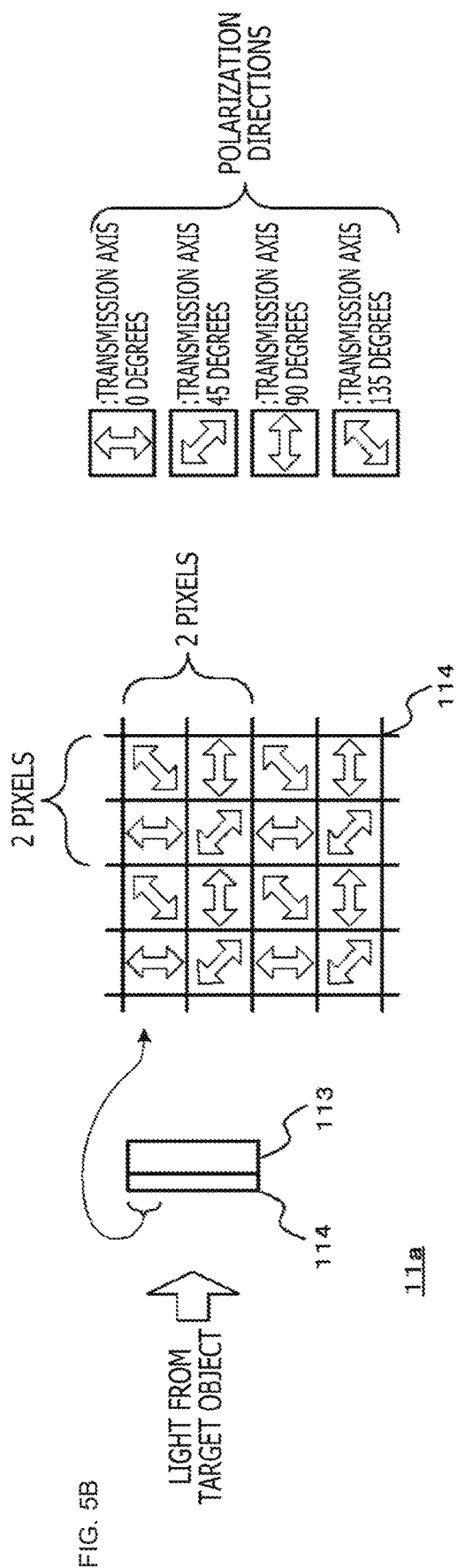
FIG. 5A
FIG. 5B

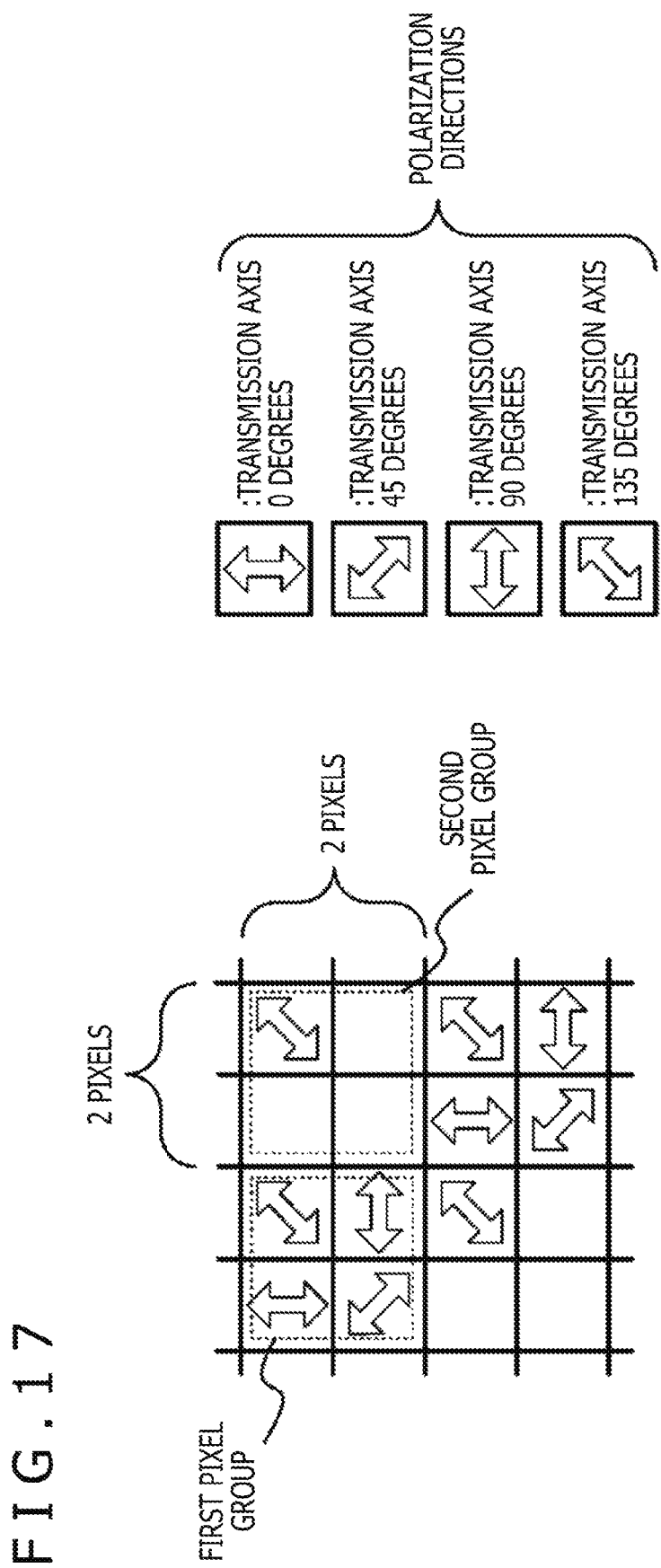

IMAGE PROCESSING DEVICE AND IMAGE PROCESSING METHOD

CROSS REFERENCE TO RELATED APPLICATIONS

This application is a U.S. National Phase of International Patent Application No PCT/JP2018/038079 filed on Oct. 12, 2018, which claims priority benefit of Japanese Patent Application No. JP 2017-244982 filed in the Japan Patent Office on Dec. 21, 2017. Each of the above-referenced applications is hereby incorporated herein by reference in its entirety.

TECHNICAL FIELD

The present technology relates to an image processing device, an image processing method, and a program and makes it possible to detect the polarization properties of a target object by using an image polarized in one or more polarization directions.

BACKGROUND ART

In the past, a method of acquiring a polarized image by using an imaging section and a polarizing filter was disclosed. For example, a method disclosed in PTL 1 acquires an image polarized in a plurality of polarization directions by disposing a polarizing filter in front of an imaging section and rotating the polarizing filter for image capture. Further, another disclosed method acquires an image polarized in a plurality of different polarization directions by performing a single image capturing operation in a situation where polarizing filters differing in polarization direction are disposed for individual pixels.

Moreover, normal line information regarding an object can be acquired from an image polarized in a plurality of polarization directions. For example, NPL 1 and NPL 2 describe the calculation of normal line information that is performed by applying an image polarized in a plurality of polarization directions to a polarization model. Additionally, NPL 2 describes the use of three or more polarization brightnesses differing in polarization direction, in a case where a polarized image is applied to a polarization model.

CITATION LIST

Patent Literature

[PTL 1]
PCT Patent Publication No. WO 2008/099589

Non Patent Literature

[NPL 1]
Daisuke Miyazaki and Katsushi Ikeuchi, "Basic Theory of Polarization and Its Applications," Journal of Information Processing Society of Japan, Computer Vision and Image Media, 2008

[NPL 2]
Gary A. Atkinson and Edwin R. Hancock, "Recovery of surface orientation from diffuse polarization," IEEE Transactions of Image Processing, Vol. 15, Issue 6, pp. 1653-1664, 2006

SUMMARY

Technical Problems

Incidentally, in a case where a polarization model is to be detected based on a polarized image, three or more polarization brightnesses differing in polarization direction are required. In some cases, however, the required number of polarization brightnesses may not be obtained depending, for example, on imaging conditions. If, for example, saturation or a blocked-up shadow occurs in an image sensor, polarization brightnesses having three or more polarization directions cannot be obtained.

In view of the above circumstances, an object of the present technology is to provide an image processing device, an image processing method, and a program that are capable of detecting the polarization properties of a target object by using an image polarized in one or more polarization directions.

Solution to Problems

According to a first aspect of the present technology, there is provided an image processing device including a polarization model detection section. The polarization model detection section detects a polarization model indicative of the polarization properties of a target object, on the basis of a polarized image of the target object having one or more polarization directions and a polarization parameter acquired by a polarization parameter acquisition section.

The first aspect of the present technology detects a polarization model indicative of the polarization properties of a target object, on the basis of a polarized image of the target object having one or more polarization directions and a polarization parameter acquired by a polarization parameter acquisition section. Based on the number of polarization directions of the polarized image, the polarization parameter acquisition section includes one or more combinations of a non-polarized image acquisition section, an information storage section, and a phase storage section. The non-polarized image acquisition section acquires a non-polarized image of the target object. The information storage section stores property information and the zenith angle of a normal line regarding the target object. The phase storage section stores the azimuth angle of the normal line of the target object. Further, in a case where the non-polarized image acquisition section is disposed in the polarization parameter acquisition section, a sensitivity correction section is additionally included. The sensitivity correction section corrects the non-polarized image acquired by the non-polarized image acquisition section for the sensitivity of the polarized image. The polarization parameter acquisition section acquires a polarization parameter indicative of the amplitude of the polarization model, on the basis of the non-polarized image corrected by the sensitivity correction section and the property information stored in the information storage section. Moreover, the non-polarized image acquisition section may acquire a non-polarized image by capturing an image without using a polarizer in a polarized image acquisition section that acquires the polarized image of the target object.

It is assumed that the polarized image acquisition section, which acquires the polarized image of the target object, includes polarization pixels with a detachable polarizer or with the polarizer and non-polarization pixels without the polarizer. The zenith angle stored in the information storage section is an angle based on geometric information regarding the target object and the polarized image acquisition section, which acquires the polarized image of the target object. Alternatively, the zenith angle stored in the information storage section is an angle based on the three-dimensional shape of the target object. Further, the information storage section stores reflectance property information that indicates whether the polarized image represents information regarding a specular reflection subject or a diffuse reflection subject. The azimuth angle stored in the phase storage section is an angle based on geometric information regarding the target object and the polarized image acquisition section, which acquires a polarized image of the target object. Alternatively, the azimuth angle stored in the phase storage section is an angle based on the three-dimensional shape of the target object. Further, the azimuth angle stored in the phase storage section may be an angle based on the azimuth angle of a nearby location calculated on the basis of an image polarized in three or more polarization directions. Additionally included is an azimuth angle input section for setting the azimuth angle. The azimuth angle input section causes the phase storage section to store an azimuth angle based on a user operation and uses a polarization model detected based on the azimuth angle stored in the phase storage section, in order to display an image obtained by removing reflection components from a polarized image.

Furthermore, a saturation detection section is additionally included to detect whether a polarized image is saturated. The polarization model detection section detects a polarization model on the basis of a polarized image detected by the saturation detection section as being unsaturated and a polarization parameter acquired by the polarization parameter acquisition section. Moreover, the image processing device may include a polarized image acquisition section that acquires the polarized image of the target object and include a reflection removal section that removes reflection components from an image of the target object on the basis of the polarized image of the target object and the polarization model detected by the polarization model detection section.

According to a second aspect of the present technology, there is provided an image processing method including the step of allowing a polarization model detection section to detect a polarization model indicative of the polarization properties of a target object on the basis of a polarized image of the target object and a polarization parameter acquired by a polarization parameter acquisition section.

According to a third aspect of the present technology, there is provided a program for causing a computer to detect a polarization model indicative of the polarization properties of a target object. The program causes the computer to execute the step of detecting the polarization model on the basis of a polarized image of the target object, which is acquired by a polarized image acquisition section, and a polarization parameter acquired by a polarization parameter acquisition section.

It should be noted that the program according to the present technology is a program that can be supplied to a general-purpose computer capable, for example, of executing various program codes by using storage media or communication media supplying the program in a computer-readable format, such as optical disks, magnetic disks, semiconductor memories, or other storage media or networks or other communication media. When the program is supplied in the computer-readable format, a process based on the program is implemented on the computer.

Advantageous Effect of Invention

The present technology detects a polarization model indicative of the polarization properties of a target object, on the basis of a polarized image of the target object having one or more polarization directions and a polarization parameter acquired by a polarization parameter acquisition section. Therefore, even in a case where an image polarized in three or more polarization directions cannot be acquired, the present technology makes it possible to detect the polarization properties of the target object. It should be noted that the advantageous effects described in the present specification are merely illustrative and not restrictive. The present technology is not limited to such advantageous effects and may provide additional advantageous effects.

BRIEF DESCRIPTION OF DRAWINGS

FIG. 3 is a diagram illustrating patterns of acquired information and an unknown parameter.

FIG. 4 is a diagram illustrating a configuration of a first embodiment.

FIGS. 5A and 5B are set of diagrams illustrating configurations of a polarized image acquisition section.

FIGS. 16A and 1B are set of diagrams illustrating a case where the polarized image acquisition section is disposed in a vehicle in order to capture an image of an area ahead of the vehicle.

FIG. 17 is a diagram illustrating a case where an azimuth angle is an angle based on the azimuth angle of a nearby location.

DESCRIPTION OF EMBODIMENTS

Embodiments of the present technology will now be described. It should be noted that the description is given in the following order.

1. Polarization Model
2. Configuration of Image Processing Device
3. First Embodiment
4. Second Embodiment
5. Third Embodiment 6. Fourth Embodiment
7. Alternative Embodiment
8. Acquisition of Zenith Angle and Azimuth Angle
9. Application Examples

1. Polarization Model

Figure 1:
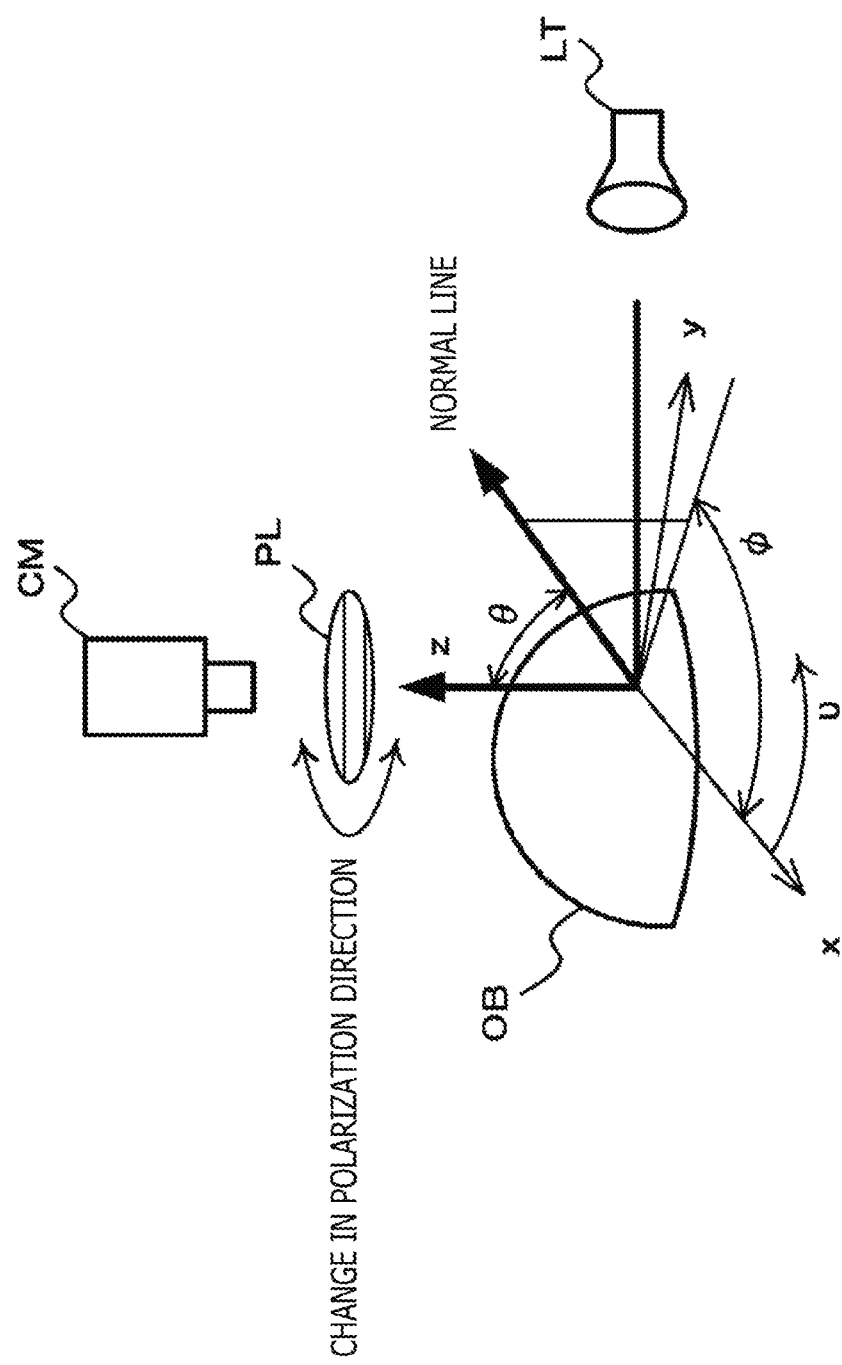
FIG. 1 is a diagram illustrating a polarization model.

FIG. 1 is a diagram illustrating a polarization model. For example, a light source LT is used to illuminate a target object OB, and an imaging section CM captures an image of the target object OB through a polarizing plate PL. In this case, the captured image (hereinafter referred to as a "polarized captured image") is such that the brightness of the target object OB varies with the direction of polarization of the polarizing plate PL. It should be noted that Imax represents the highest brightness while Imin represents the lowest brightness. Further, it is assumed that the x- and y-axes of two-dimensional coordinates are on the plane of the polarizing plate PL and that the y-axis angle with respect to the x-axis is a polarization angle υ indicative of the polarization direction of the polarizing plate PL (the angle of a transmission axis). The polarization plate PL has a cycle of 180 degrees so that it returns to an initial polarization state when the polarization direction is rotated 180 degrees. It is also assumed that the polarization angle υ formed when the highest brightness Imax is observed is the azimuth angle φ of a normal line. In a case where the above definition is formulated, the brightness I(υ) observed when the polarization direction of the polarizing plate PL is changed can be expressed by Equation (1). In the present technology, Equation (1) is referred to as a polarization model.

$$I(\upsilon)=\alpha+\beta \times \mathrm{Cos}(2\upsilon-2\phi) \quad (1)$$

Figure 2:
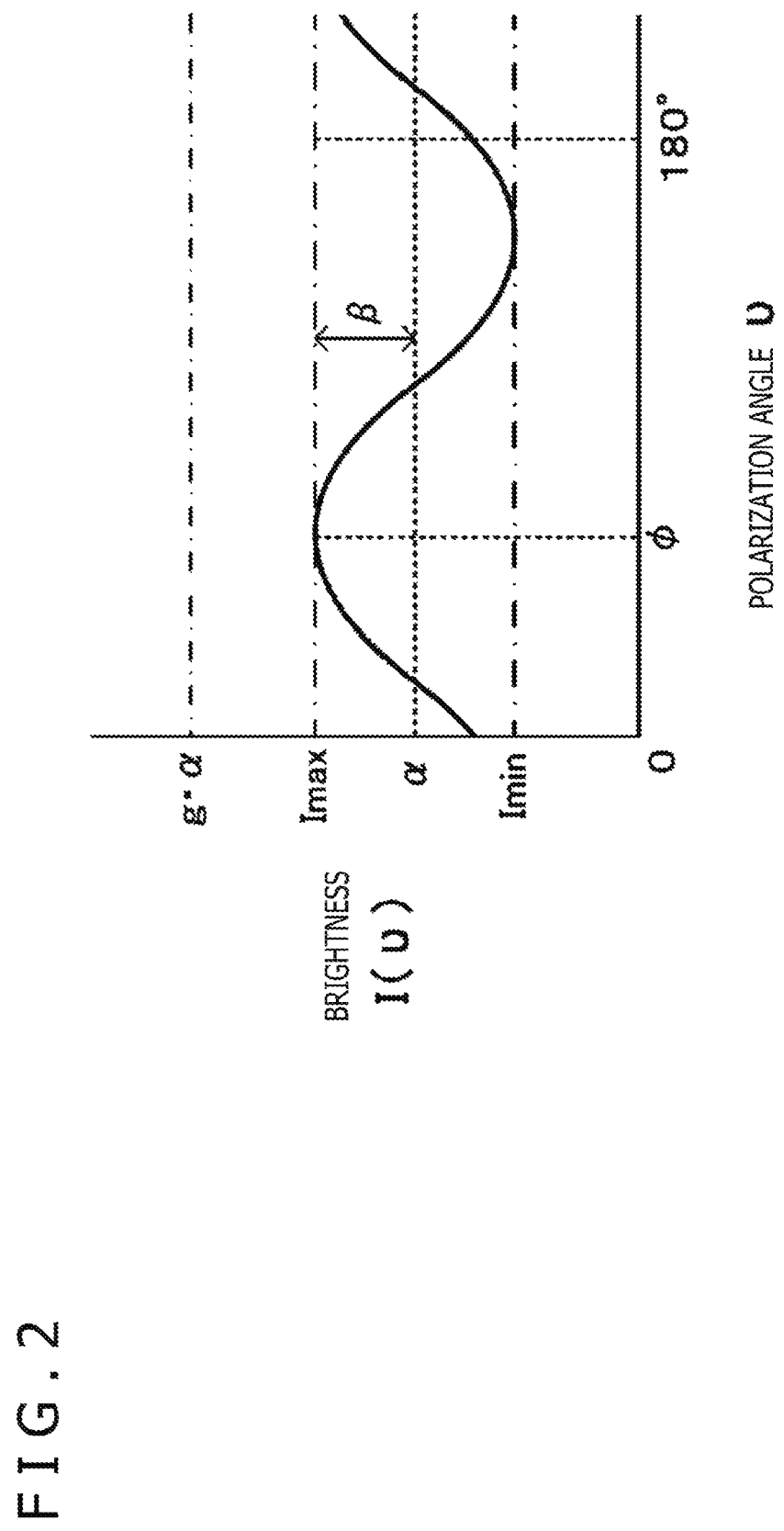
FIG. 2 is a diagram illustrating the relation between brightness and polarization angle.

FIG. 2 illustrates the relation between brightness and a polarization angle. Parameters α, β, and φ in Equation (1) are parameters indicative of a Cos waveform produced by polarization. Parameter α indicates the average brightness of the polarization model. Parameter β indicates the amplitude of the polarization model and is the magnitude between the average brightness of the polarization model and the maximum value of the polarization model or ½ the difference between the maximum and minimum values of the polarization model. Parameter φ indicates the azimuth angle, and thus, the phase of the polarization model. Further, the result of multiplying the average brightness α by a sensitivity correction gain g which compensates for a sensitivity decrease caused by the use of the polarizing plate PL is equivalent to the brightness of an image captured without the intermediary of the polarizing plate PL (hereinafter referred to as a "non-polarized captured image").

2. Configuration of Image Processing Device

An image processing device according to the present technology detects a polarization model by calculating an unknown parameter on the basis of acquired information and a known parameter. More specifically, a polarization model detection section detects a polarization model indicative of the polarization properties of a target object, on the basis of a polarized image of the target object having one or more polarization directions and a polarization parameter acquired by a polarization parameter acquisition section.

FIG. 3 illustrates patterns of acquired information and an unknown parameter. In pattern 1, a polarized image (one or more polarization directions), a non-polarized image (average brightness α), and an amplitude β are acquired so that the polarization model detection section calculates a phase (azimuth angle) φ. It should be noted that the average brightness α can be acquired based on a non-polarized image as described below. In pattern 2, a polarized image (one or more polarization directions), a non-polarized image (average brightness α), and a phase φ are acquired so that the polarization model detection section calculates the amplitude β. In pattern β a polarized image (two or more polarization directions) and a non-polarized image (average brightness α) are acquired so that the polarization model detection section calculates the phase φ and the amplitude β. In pattern 4, a polarized image (two or more polarization directions) and a phase φ are acquired so that the polarization model detection section calculates the average brightness α and the amplitude β.

Based on the number of polarization directions of the polarized image, the polarization parameter acquisition section includes one or more combinations of a non-polarized image acquisition section, an information storage section, and a phase storage section. The non-polarized image acquisition section acquires a non-polarized image of the target object. The information storage section stores property information regarding the target object and the zenith angle of a normal line. The phase storage section stores the azimuth angle of the normal line of the target object. The polarization parameter acquisition section acquires information indicated as acquired information in FIG. 3 except for the information regarding the polarized image. The patterns are each described below.

3. First Embodiment

A first embodiment of the image processing device will now be described. The first embodiment corresponds to pattern 1 in FIG. 3 and detects a polarization model on the basis of an image polarized in one or more polarization directions, a non-polarized image, and the amplitude of a polarization model.

FIG. 4 illustrates a configuration of the first embodiment. An image processing device 10-1 includes a polarized image acquisition section 11a, a polarization parameter information acquisition section 12-1, and a polarization model detection section 13-1.

The polarized image acquisition section 11a acquires an image polarized in one or more polarization directions and outputs the acquired polarized image to the polarization model detection section 13-1. Acquiring an image polarized in one or more polarization directions includes two different cases. In one case, the polarized image to be acquired has one or more polarization directions while all pixels have the same polarization direction. In the other case, the polarized image to be acquired has polarization pixels having one or more polarization directions.

FIGS. 5A and 5B illustrate configurations of the polarized image acquisition section. For example, the configuration illustrated in FIG. 5A is such that a polarizing plate 112 is disposed in front of an imaging optical system including, for example, an imaging lens and a camera block 111 including, for example, an image sensor. The polarized image acquisition section 11a in this configuration acquires an image polarized in each polarization direction by rotating the polarizing plate 112 and capturing an image. For example, when an image is captured at such a time point that the rotational phase difference of the polarizing plate 112 is 0 or 180 degrees, a polarized image is acquired in such a manner that each pixel has one polarization direction. Further, when an image is captured at such a time point that the rotational phase difference of the polarizing plate 112 is 45 degrees, an image polarized in each of four polarization directions can be acquired in such a manner that all pixels have the same polarization direction. Furthermore, when the polarizing plate 112 is detachable, a non-polarized image can be acquired.

The configuration illustrated in FIG. 5B is such that a polarizing element (e.g., a wire grid) 114 is disposed on the incident surface of an image sensor 113. It should be noted that one pixel group in FIG. 5B is formed by 2×2 pixels and that the pixels in one pixel group have four different polarization directions. When the polarized image acquisition section 11*a* is configured as described above, it is possible to acquire a polarized image including polarization pixels having four different polarization directions. Further, when a polarized image is to be acquired, the polarization pixels in one pixel group do not always need to have one of four polarization directions as indicated in FIG. 5B. Alternatively, a polarized image including polarization pixels having three directions, two directions, or one direction of polarization may be acquired as three directions, two directions, or one direction of polarization. Furthermore, the polarized image acquisition section 11*a* may include non-polarization pixels in addition to polarization pixels. Moreover, in a case where the polarized image acquisition section 11*a* is configured as depicted in FIG. 5B or in FIGS. 6A and 6B, as regards the polarization direction in which the brightness of a pixel targeted for processing is not obtained, polarization brightness may be calculated by performing, for example, an interpolation process or a filtering process through the use of the brightness of a polarization pixel (polarization brightness) equal to the brightness provided by the polarization direction. In this case, a polarized image in which all pixels have the same polarization direction can be acquired for each polarization direction. It should be noted that the polarized image acquisition section 11*a* is only required to be configured so as to acquire an image polarized in one or more polarization directions. The polarized image acquisition section 11*a* need not always be configured as depicted in FIGS. 5A and 5B. The polarized image acquisition section 11*a* outputs the acquired polarized image to the polarization model detection section 13-1.

As depicted in FIG. 4, the polarization parameter information acquisition section 12-1 includes a non-polarized image acquisition section 121, a sensitivity correction section 122, and a polarization model amplitude detection section 123.

The non-polarized image acquisition section 121 acquires a non-polarized image by capturing an image of a target object without using a polarizer (e.g., the polarizing plate 112 or the polarizing element 114). Further, the non-polarized image acquisition section 121 calculates the average brightness α of a polarization model on the basis of the acquired non-polarized image.

In a case where, for example, the polarized image acquisition section 11*a* is configured as depicted in FIG. 5A, the non-polarized image acquisition section 121 acquires a non-polarized image that is generated by capturing an image after removing the polarizing plate 112 disposed in front of the camera block 111. Further, in a case where, for example, the polarized image acquisition section 11*a* is configured as depicted in FIG. 5B, non-polarization pixels may be disposed in the image sensor 113 in order to acquire a non-polarized image based on a signal generated by the non-polarization pixels.

Figure 6A:
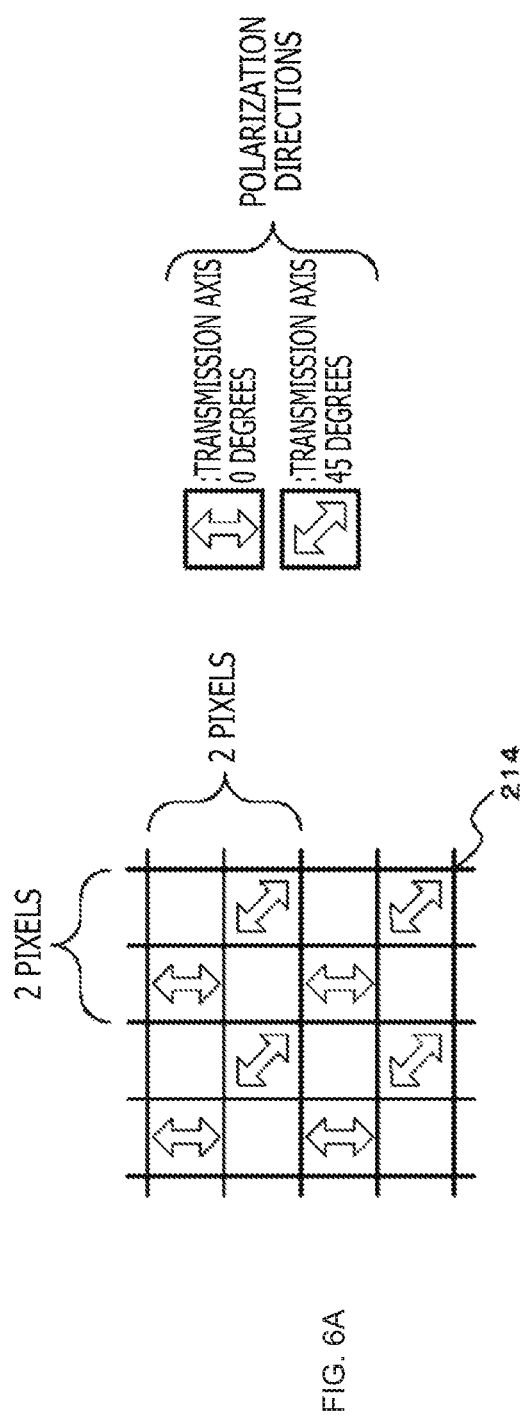
FIGS. 6A and 6B are set of diagrams illustrating pixel arrays of polarization pixels and non-polarization pixels.
Figure 6B:
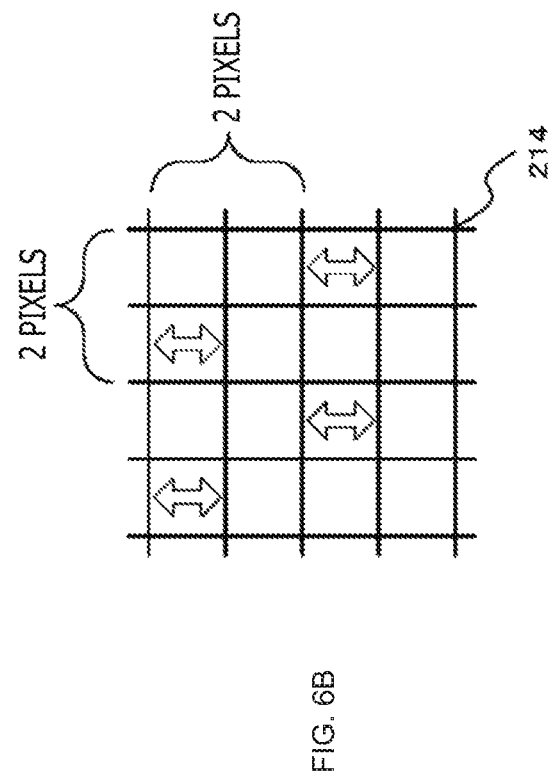

FIGS. 6A and 6B illustrate pixel arrays of polarization pixels and non-polarization pixels. Depicted in FIG. 6A is a case where one pixel group is formed by 2×2 pixels and includes two polarization pixels and two non-polarization pixels. The two polarization pixels each have either one of two different polarization directions (e.g., transmission axis angles of 0 and 45 degrees). Meanwhile, depicted in FIG. 6B is a case where one pixel group is formed by 2×2 pixels and includes one polarization pixel and three non-polarization pixels. The one polarization pixel has one polarization direction (e.g., a transmission axis angle of 0 degrees).

Further, the non-polarized image acquisition section 121 may acquire a non-polarized image in a common imaging device configured without using the polarizing plate 112 or the polarizing element 114 by capturing an image of a desired target object in a similar manner from the position of the polarized image acquisition section 11*a*.

Figure 7:
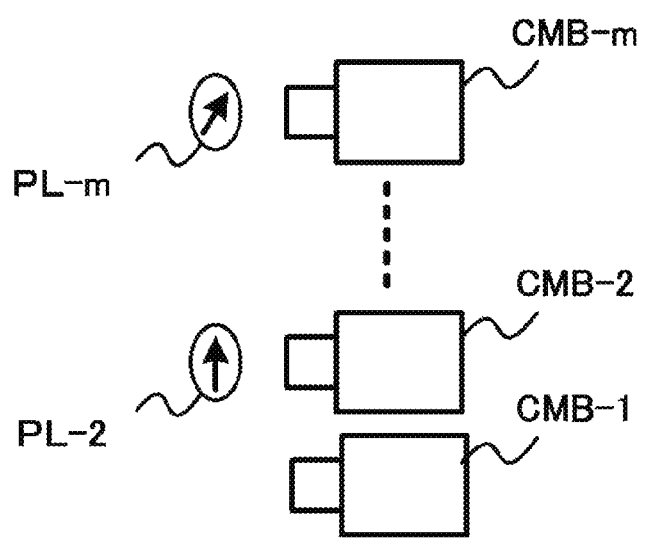
FIG. 7 is a diagram illustrating a multi-camera.

Furthermore, a multi-camera including a plurality of camera blocks with differently oriented polarizing plates mounted in front of the camera blocks and a camera block without a polarizing plate may be used as the polarized image acquisition section 11*a* and the non-polarized image acquisition section 121. It should be noted that FIG. 7 illustrates a multi-camera having camera blocks CMB-1 and CMB-2 to CMB-m (m≥2). The camera block CMB-1 has no polarizing plate. The camera blocks CMB-2 to CMB-m respectively have polarizing plates PL-2 to PL-m which vary in the polarization direction from one camera block to another and are disposed on the side of incidence of light from a target object. In this case, the camera block CMB-1 acquires a non-polarized image, and the camera blocks CMB-2 to CMB-m acquire a polarized image. It should be noted that the camera blocks CMB-1 to CMB-m differ in the viewpoint position and thus perform parallax correction on a non-polarized image and a polarized image.

The sensitivity correction section 122 performs sensitivity correction on the brightness I of a non-polarized image as indicated in Equation (2) by using the sensitivity correction gain g, which compensates for a sensitivity difference from a polarized image, and calculates the average brightness α of the polarization model on an individual pixel basis (or on an individual pixel group basis). The sensitivity correction section 122 outputs the calculated average brightness α to the polarization model amplitude detection section 122 and the polarization model detection section 13-1.

$$\alpha = g \cdot I \qquad (2)$$

Figure 8:
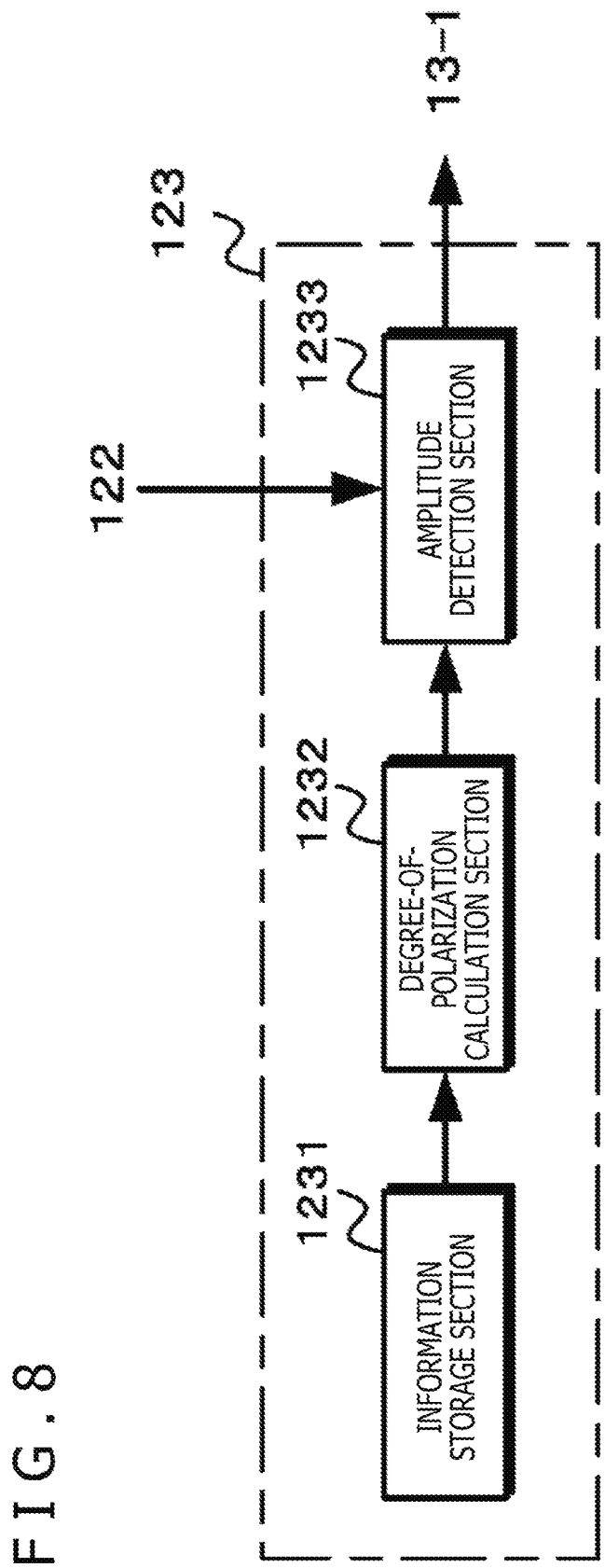
FIG. 8 is a diagram illustrating a configuration of a polarization model amplitude detection section.

The polarization model amplitude detection section 123 detects the amplitude of the polarization model by using the average brightness α calculated by the sensitivity correction section 122. FIG. 8 illustrates a configuration of the polarization model amplitude detection section. The polarization model amplitude detection section 123 includes an information storage section 1231, a degree-of-polarization calculation section 1232, and an amplitude detection section 1233. As described below, the information storage section 1231 stores the zenith angle θ of the normal line of the target object, a refractive index r, and reflectance property information indicative of whether the subject is diffuse reflection or specular reflection. The degree-of-polarization calculation section 1232 selects either Equation (3) or Equation (4) according to the reflectance property information stored in the information storage section 1231 and calculates the degree of polarization ρ(θ, r) based on the zenith angle θ and the refractive index r.

[Math. 1]

$$\rho(\theta, r) = \frac{\left(r - \frac{1}{r}\right)^2 \sin^2 \theta}{2 + 2r^2 - \left(r + \frac{1}{r}\right)^2 \sin^2 \theta + 4 \cos \theta \sqrt{r^2 - \sin^2 \theta}} \quad (3)$$

$$\rho(\theta, r) = \frac{2 \sin^2 \theta \cos \theta \sqrt{r^2 - \sin^2 \theta}}{r^2 - \sin^2 \theta - r^2 \sin^2 \theta + 2 \sin^4 \theta} \quad (4)$$

Further, the amplitude detection section 1233 calculates the amplitude β from Equation (5) by using the degree of polarization ρ(θ, r) calculated by the degree-of-polarization calculation section 1232 and the average brightness α supplied from the non-polarized image acquisition section 121, and outputs the calculated amplitude β to the polarization model detection section 13-1.

$$\beta = \alpha \cdot \rho(\theta, r) \quad (5)$$

Returning to FIG. 4, as the average brightness α and amplitude β of the polarization model are supplied from the polarization parameter information acquisition section 12-1, the polarization model detection section 13-1 calculates the phase ϕ which is an unknown parameter. The polarization model detection section 13-1 calculates the phase ϕ from Equation (6) by using the average brightness α and amplitude β of the polarization model and the polarization brightness I(ϕn) of an image polarized in one or more polarization directions, which is supplied from the polarized image acquisition section 11a. It should be noted that "n" is an index indicative of the polarization direction of polarization brightness. In the later description, it is assumed that the number of polarization directions is represented by "N" (n=1 to N). The polarization model detection section 13-1 outputs, as the result of polarization model detection, the average brightness α, the amplitude β, and the phase ϕ, which are the parameters of the polarization model.

[Math. 2]

$$\phi = \frac{1}{N} \sum_{n}^{N} \left( \phi_n - \frac{1}{2} \cos^{-1}\left(\frac{I(\phi_n) - \alpha}{\beta}\right) \right) \quad (6)$$

Figure 9:
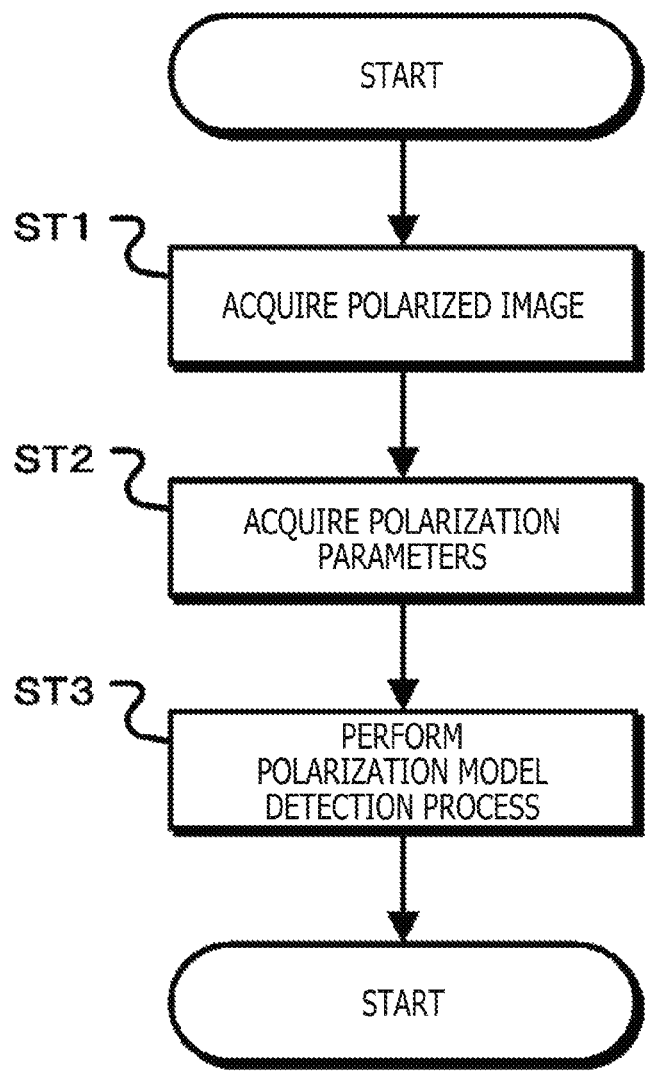
FIG. 9 is a flowchart illustrating operations of the first embodiment.

FIG. 9 is a flowchart illustrating the operations of the first embodiment. In step ST1, the image processing device 10-1 acquires an image polarized in one or more polarization directions. The image processing device 10-1 acquires a polarized image that is acquired by the camera block 111 having the polarizing plate 112 disposed in front of the camera block 111 or by an image sensor having polarization pixels having one or more polarization directions, and then proceeds to step ST2.

In step ST2, the image processing device 10-1 acquires polarization parameters. Based on a non-polarized image derived from sensitivity correction, the image processing device 10-1 calculates the average brightness α of the polarization model. Further, based on the calculated average brightness α and the pre-stored information regarding the zenith angle θ of the normal line of the target object, the refractive index r, and the reflectance property information indicative of whether the subject is diffuse reflection or specular reflection, the image processing device 10-1 calculates the amplitude β of the polarization model and then proceeds to step ST3.

In step ST3, the image processing device 10-1 performs a polarization model detection process. The image processing device 10-1 calculates the phase ϕ of the polarization model on the basis of the average brightness α and amplitude β of the polarization model, the image polarized in one or more polarization directions, which is acquired in step ST1 from the polarized image acquisition section 11a, and the average brightness α and amplitude β acquired in step ST2. As a result, the average brightness α, amplitude β, and phase ϕ of the polarization model are acquired. Further, performing steps ST1 to ST3 on an individual pixel basis or on an individual pixel group basis makes it possible to detect the polarization model of the target object on an individual pixel basis or on an individual pixel group basis.

As described above, the first embodiment makes it possible to detect a polarization model from a non-polarized image, the amplitude of the polarization model, and an image polarized in one or more polarization directions. Further, in a case where polarization pixels and non-polarization pixels are used as depicted in FIG. 6B, it is possible to not only detect a polarization model from an image polarized in one polarization direction but also detect a polarization model without attaching or detaching a polarizer while many non-polarization pixels are used and acquire a high-resolution non-polarized image with high sensitivity. Consequently, when, for instance, a detected polarization model is used for reflection removal, it is possible to easily produce, for example, an archive of works of art at high resolution while avoiding reflections from unwanted surrounding objects.

4. Second Embodiment

A second embodiment of the image processing device will now be described. The second embodiment corresponds to pattern 2 in FIG. 3 and detects a polarization model from a non-polarized image, a phase, and an image polarized in one or more polarization directions.

Figure 10:
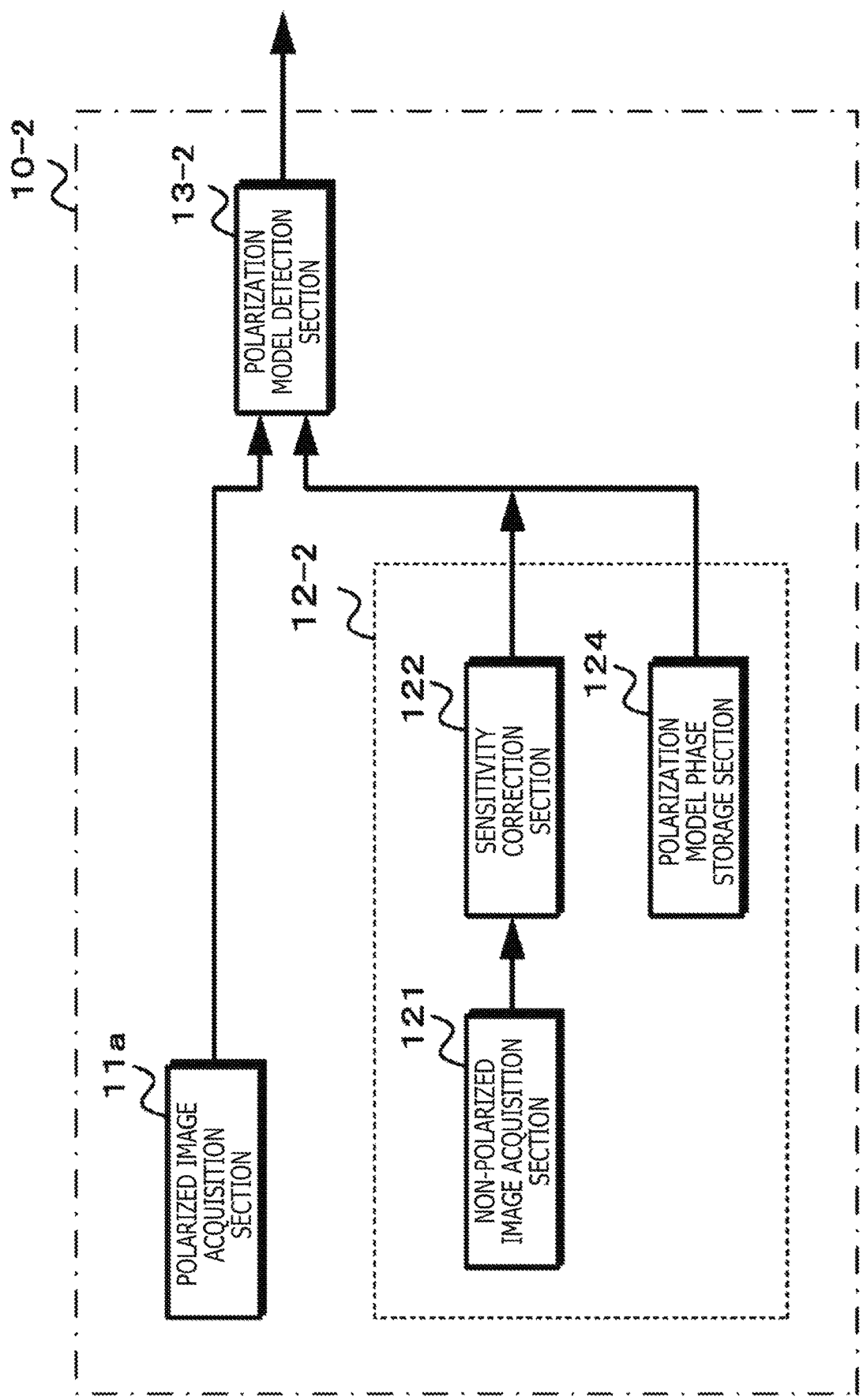
FIG. 10 is a diagram illustrating a configuration of a second embodiment.

FIG. 10 illustrates a configuration of the second embodiment. An image processing device 10-2 includes the polarized image acquisition section 11a, a polarization parameter information acquisition section 12-2, and a polarization model detection section 13-2.

The polarized image acquisition section 11a has a configuration similar to that in the first embodiment, acquires an image polarized in one or more polarization directions, and outputs the acquired polarized image to the polarization model detection section 13-2.

The polarization parameter information acquisition section 12-2 includes the non-polarized image acquisition section 121, the sensitivity correction section 122, and a polarization model phase storage section 124.

The non-polarized image acquisition section 121 has a configuration similar to that in the first embodiment, acquires a non-polarized image and outputs the acquired non-polarized image to the sensitivity correction section 122. The sensitivity correction section 122 has a configuration similar to that in the first embodiment, performs sensitivity correction on the brightness I of a non-polarized image as indicated in Equation (2) by using the sensitivity correction gain g which compensates for a sensitivity difference from a polarized image, and outputs the average brightness α of the polarization model to the polarization model detection section 13-2.

The polarization model phase storage section 124 pre-stores a phase (azimuth angle) ϕ. The polarization model phase storage section 124 outputs the stored phase ϕ to the polarization model detection section 13-2.

The polarization model detection section 13-2 calculates an amplitude β which is an unknown parameter, because the average brightness α and phase ϕ of the polarization model are supplied from the polarization parameter information acquisition section 12-2. The polarization model detection section 13-2 calculates the amplitude β from Equation (7) by using the average brightness α and phase ϕ of the polarization model and the polarization brightness I(ϕn) of an image polarized in one or more polarization directions which is supplied from the polarized image acquisition section 11a. The polarization model detection section 13-2 outputs, as the result of polarization model detection, the average brightness α, the amplitude β, and the phase ϕ, which are the parameters of the polarization model.

[Math. 3]

$$\beta = \frac{1}{N}\sum_{n}^{N} \frac{I_n - \alpha}{\cos 2(\phi_n - \phi)} \qquad (7)$$

It should be noted that the operations of the image processing device according to the second embodiment are performed in a stepwise manner similar to that in the first embodiment, but processing operations performed in the individual steps are different from those in the first embodiment as described above.

As described above, the second embodiment makes it possible to detect a polarization model from a non-polarized image, a phase, and an image polarized in one or more polarization directions.

5. Third Embodiment

A third embodiment of the image processing device will now be described. The third embodiment corresponds to pattern 3 in FIG. 3 and detects a polarization model from a non-polarized image and an image polarized in two or more polarization directions.

Figure 11:
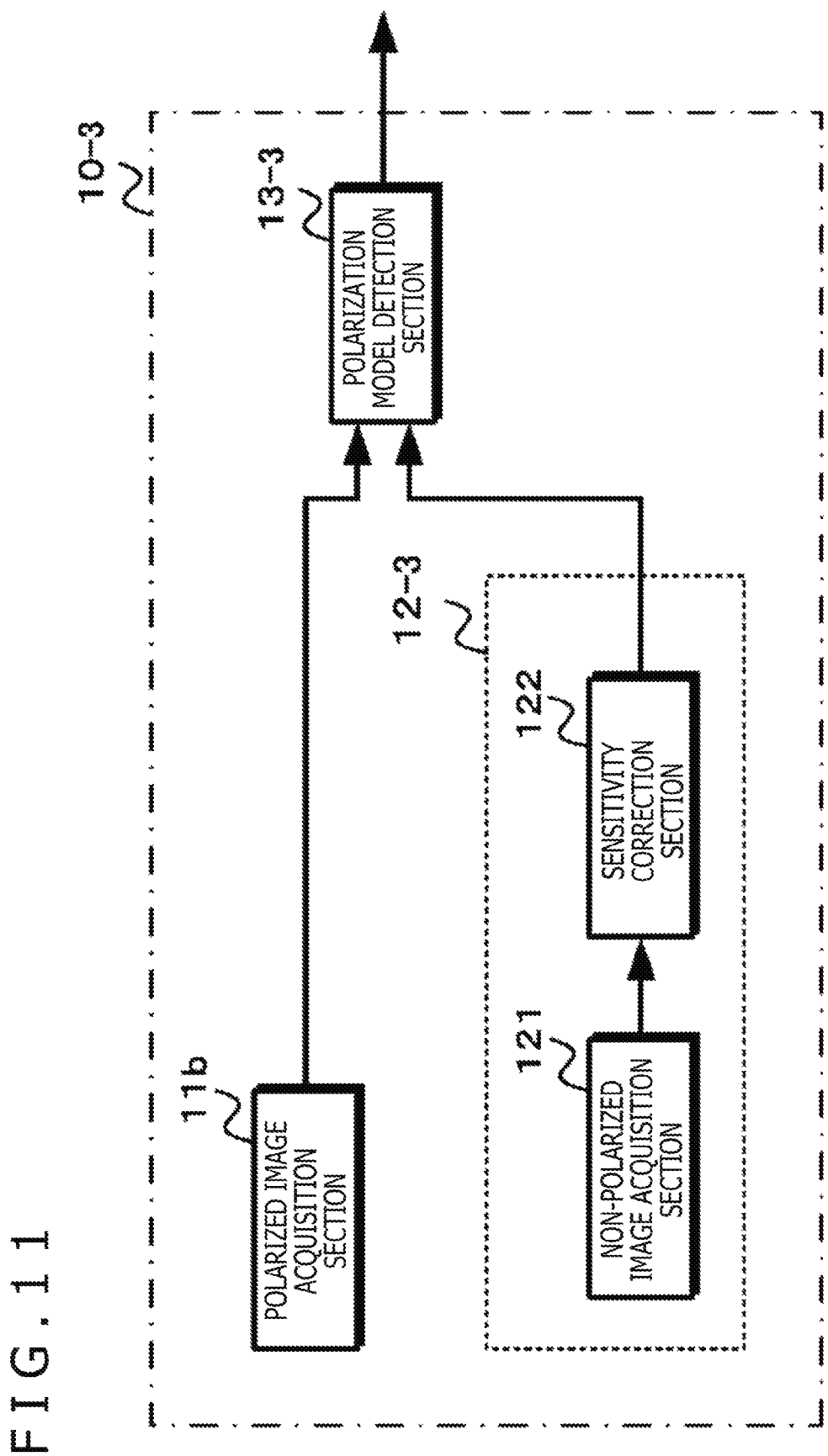
FIG. 11 is a diagram illustrating a configuration of a third embodiment.

FIG. 11 illustrates a configuration of the third embodiment. An image processing device 10-3 includes a polarized image acquisition section 11b, a polarization parameter information acquisition section 12-3, and a polarization model detection section 13-3.

The polarized image acquisition section 11b has a configuration similar to that of the polarized image acquisition section 11a in the first embodiment but differs from the polarized image acquisition section 11a in the number of polarization directions of a polarized image that can be acquired. The polarized image acquisition section 11b acquires an image polarized in two or more of polarization direction and outputs the acquired polarized image to the polarization model detection section 13-3.

The polarization parameter information acquisition section 12-3 includes the non-polarized image acquisition section 121 and the sensitivity correction section 122.

The non-polarized image acquisition section 121 has a configuration similar to that in the first embodiment, acquires a non-polarized image, and outputs the acquired non-polarized image to the sensitivity correction section 122. The sensitivity correction section 122 has a configuration similar to that in the first embodiment, performs sensitivity correction on the brightness I of a non-polarized image as indicated in Equation (2) by using the sensitivity correction gain g which compensates for a sensitivity difference from a polarized image, and outputs the average brightness α of the polarization model to the polarization model detection section 13-3.

The polarization model detection section 13-3 calculates the amplitude β and the phase ϕ which are unknown parameters, because the average brightness α of the polarization model is supplied from the polarization parameter information acquisition section 12-3.

The polarization model detection section 13-3 calculates the amplitude β and the phase ϕ by using the average brightness α of the polarization model which is supplied from the polarization parameter information acquisition section 12-2 and the polarization brightness I(ϕn) (n≥2) of an image polarized in two or more polarization directions which is supplied from the polarized image acquisition section 11b. Further, the polarization model detection section 13-3 outputs, as the result of polarization model detection, the average brightness α of the polarization model and the calculated amplitude β and phase ϕ.

The polarization model detection section 13-3 calculates the amplitude β and the phase ϕ in accordance with Equations (8) and (9). In Equations (8) and (9), "A" is calculated based on Equation (10), and "B" is calculated based on Equation (11). Further, in Equations (10) and (11), "X" is calculated based on Equation (12), "Y" is calculated based on Equation (13), and "Z" is calculated based on Equation (14).

[Math. 4]

$$\beta = \sqrt{A^2 + B^2} \qquad (8)$$

$$\phi = \frac{1}{2}\sin^{-1}\frac{A}{\sqrt{A^2 + B^2}} = \frac{1}{2}\cos^{-1}\frac{B}{\sqrt{A^2 + B^2}} \qquad (9)$$

$$A = \frac{(I(\phi_n) - \alpha)\sum_{n}^{N} J_n \cos 2\phi_n - Z\sum_{n}^{N}(I(\phi_n) - \alpha)\sin 2\phi_n}{ZX - Y^2} \qquad (10)$$

$$B = \frac{X\sum_{n}^{N}(I(\phi_n) - \alpha)\cos 2\phi_n - Y\sum_{n}^{N}(I(\phi_n) - \alpha)\sin 2\phi_n}{ZX - Y^2} \qquad (11)$$

$$X = \sum_{n}^{N} \sin 2\phi_n \cdot \sin 2\phi_n \qquad (12)$$

$$Y = \sum_{n}^{N} \sin 2\phi_n \cdot \cos 2\phi_n \qquad (13)$$

$$Z = \sum_{n}^{N} \cos 2\phi_n \cdot \cos 2\phi_n \qquad (14)$$

The polarization model detection section 13-3 outputs, as the result of polarization model detection, the average brightness α, the amplitude β, and the phase ϕ, which are the parameters of the polarization model.

It should be noted that the operations of the image processing device according to the third embodiment are performed in a stepwise manner similar to that in the first embodiment, but processing operations performed in the individual steps are different from those in the first embodiment as described above.

As described above, the third embodiment makes it possible to detect a polarization model from a non-polarized image and an image polarized in two or more polarization directions.

6. Fourth Embodiment

A fourth embodiment of the image processing device will now be described. The fourth embodiment corresponds to pattern 4 in FIG. 3 and detects a polarization model from an image polarized in two or more polarization directions and the phase (azimuth angle) of the polarization model.

Figure 12:
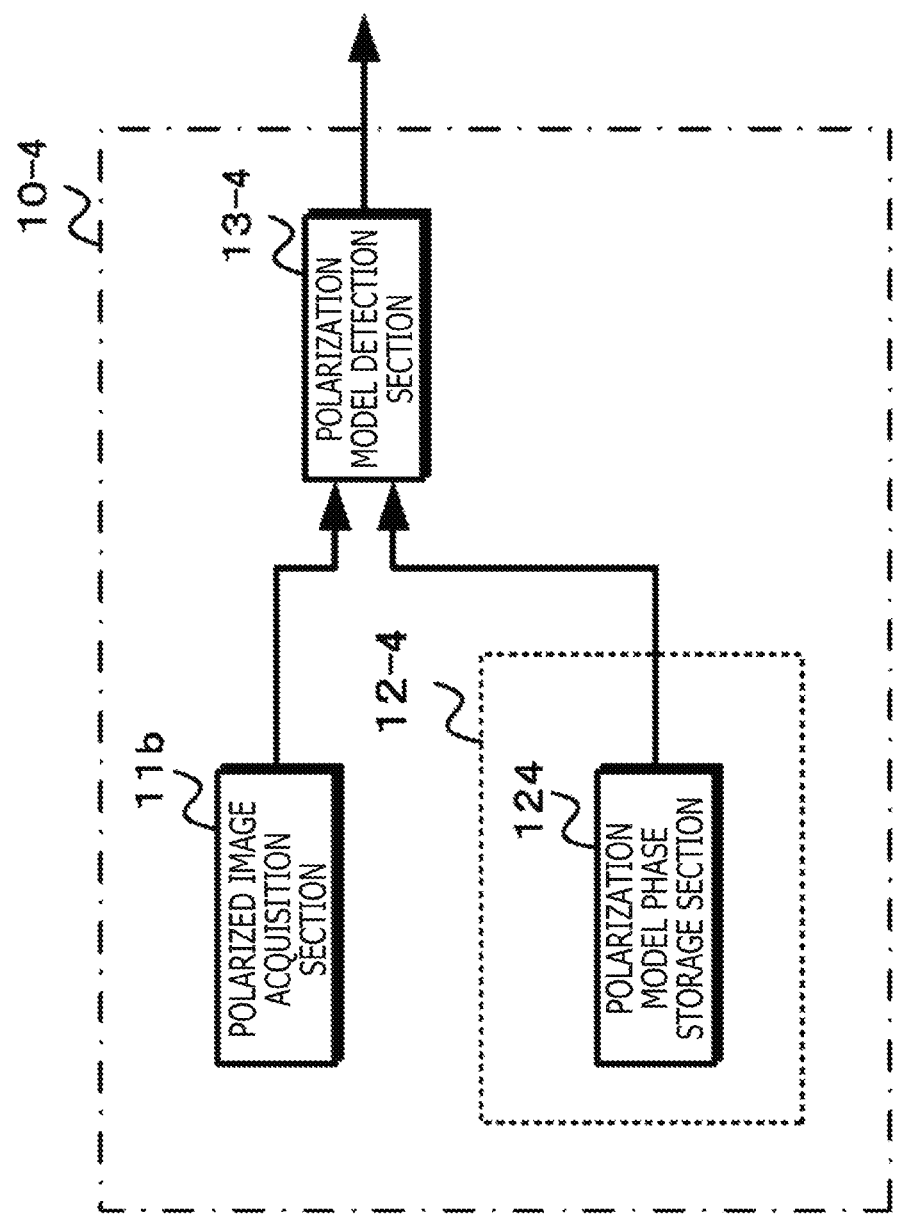
FIG. 12 is a diagram illustrating a configuration of a fourth embodiment.

FIG. 12 illustrates a configuration of the fourth embodiment. An image processing device 10-4 includes the polarized image acquisition section 11b, a polarization parameter information acquisition section 12-4, and a polarization model detection section 13-4.

The polarized image acquisition section 11b has a configuration similar to that of the polarized image acquisition section in the third embodiment, acquires an image polarized in two or more polarization directions, and outputs the acquired polarized image to the polarization model detection section 13-4.

The polarization parameter information acquisition section 12-4 includes a polarization model phase storage section 124. The polarization model phase storage section 124 pre-stores a phase (azimuth angle) φ, as is the case with the polarization model phase storage section in the second embodiment. The polarization model phase storage section 124 outputs the stored phase φ to the polarization model detection section 13-4.

The polarization model detection section 13-4 calculates the average brightness α and the amplitude β which are unknown parameters, because the phase φ of the polarization model is supplied from the polarization parameter information acquisition section 12-4. The polarization model detection section 13-4 calculates the average brightness α from Equation (15) by using the phase φ of the polarization model and the polarization brightness I(φn) (n≥2) of an image polarized in two or more polarization directions which is supplied from the polarized image acquisition section 11b, and calculates the amplitude β from Equation (16). Further, in Equations (15) and (16), "Y" is calculated from Equation (17), "P" is calculated from Equation (18), "R" is calculated from Equation (19), and "Q" is calculated from Equation (20).

The polarization model detection section 13-4 outputs, as the result of polarization model detection, the average brightness α, the amplitude and the phase φ, which are the parameters of the polarization model.

[Math. 5]

$$\alpha = \frac{PR - YQ}{P^2 - NQ} \quad (15)$$

$$\beta = \frac{PY - nR}{P^2 - NQ} \quad (16)$$

$$Y = \sum_n^N I(\phi_n) \quad (17)$$

$$P = \sin 2\phi \sum_n^N \sin 2\phi_n + \cos 2\phi \sum_n^N \cos 2\phi_n \quad (18)$$

$$R = \sin 2\phi \sum_n^N (I(\phi_n) \sin 2\phi_n) + \cos 2\phi \sum_n^N I(\phi_n) \cos 2\phi_n \quad (19)$$

$$Q = \sin^2 2\phi \sum_n^N \sin^2 2\phi_n \cos^2 2\phi \sum_n^N \cos^2 2\phi_n + \quad (20)$$

$$2 \sin 2\phi \cos 2\phi \sum_n^N \sin 2\phi_n \cos 2\phi_n$$

It should be noted that the operations of the image processing device according to the fourth embodiment are performed in a stepwise manner similar to that in the first embodiment, but processing operations performed in the individual steps are different from those in the first embodiment as described above.

As described above, the fourth embodiment makes it possible to detect a polarization model from an image polarized in two or more polarization directions and the phase (azimuth angle) of the polarization model.

7. Alternative Embodiment

Figure 13:
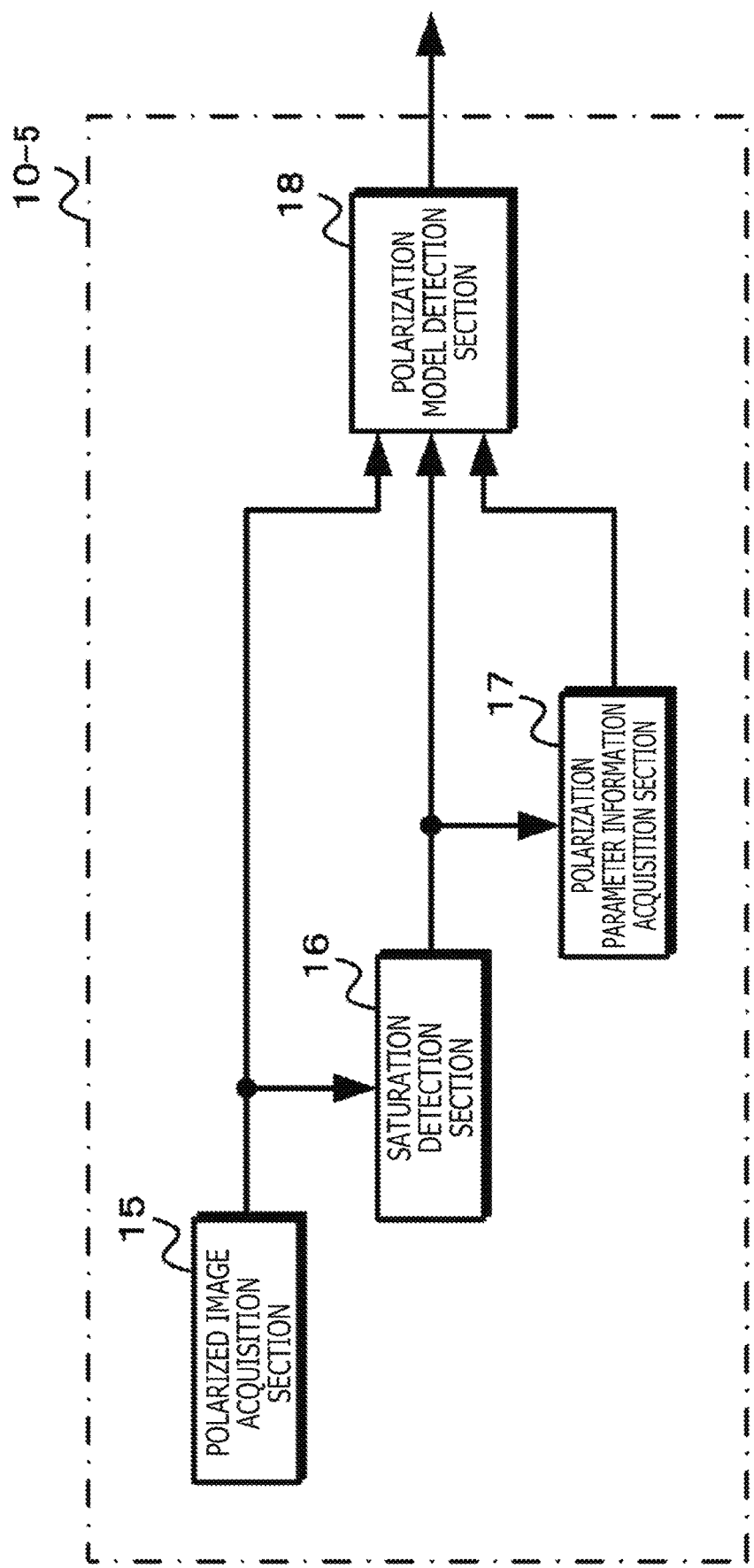
FIG. 13 is a diagram illustrating a configuration of an alternative embodiment.

FIG. 13 illustrates a configuration of an alternative embodiment. An image processing device 10-5 includes a polarized image acquisition section 15, a saturation detection section 16, a polarization parameter information acquisition section 17, and a polarization model detection section 18.

The polarized image acquisition section 15 has a configuration similar to that of any one of the polarized image acquisition section 11a or the polarized image acquisition section 11b in the second to fourth embodiments, acquires a plurality of images polarized in different polarization directions, and outputs the acquired polarized image to the saturation detection section 16 and the polarization model detection section 18.

The saturation detection section 16 detects whether the polarization brightness of each pixel in a plurality of polarized images is saturated. The saturation detection section 16 outputs the result of detection to the polarization parameter information acquisition section 17 and the polarization model detection section 18.

In a case where the detection result supplied from the saturation detection section 16 indicates that two polarization directions are unsaturated, the polarization parameter information acquisition section 17 performs a process similar to that performed by one of the polarization parameter information acquisition sections 12-1 to 12-4 in the first to fourth embodiments described above, and outputs acquired parameters to the polarization model detection section 18. Meanwhile, in a case where the detection result indicates that one polarization direction is unsaturated, the polarization parameter information acquisition section 17 performs a process similar to that performed by one of the polarization parameter information acquisition section 12-1 or the polarization parameter information acquisition section 12-2 in the first or second embodiment described above and outputs the acquired parameters to the polarization model detection section 18.

In a case where the detection result supplied from the saturation detection section 16 indicates that three or more polarization directions are unsaturated, the polarization model detection section 18 detects the parameters of the polarization model in a conventional manner by using the polarization brightness of an image polarized in three or more polarization directions, which is acquired by the polarized image acquisition section 15. Meanwhile, in a case where the detection result indicates that one or two polarization directions are unsaturated, the polarization model detection section 18 detects the polarization model by performing a process similar to the process performed by a polarization model detection section that corresponds to one of the polarization parameter information acquisition sections in the first to fourth embodiments and is selected by the polarization parameter information acquisition section 17. For example, in a case where the polarization parameter information acquisition section 17 operates similarly to the polarization parameter information acquisition section 12-1, the polarization model detection section 18 detects the polarization model by performing a process similar to that performed by the polarization model detection section 13-1. Further, in a case where the polarization parameter information acquisition section 17 operates similarly to the polarization parameter information acquisition section 12-2, the polarization model detection section 18 detects the polarization model by performing a process similar to that performed by the polarization model detection section 13-2.

When the above-described processing is performed, the operation for polarization model detection is changed based on saturation even if the polarization brightness of each polarization direction is saturated in each pixel. Therefore, the polarization properties can be detected even in a case where the polarization properties are not easily detected by a conventional method. For example, in a case where the polarized image acquisition section includes a polarization image sensor having four polarizing elements, the polarization model can be detected from a known phase even if two out of four polarization brightnesses are saturated.

Further, the configuration of the image processing device is not limited to that of the image processing device according to one of the first to fourth and alternative embodiments described above and may be a combination of the configurations of the image processing devices according to the above-described embodiments. More specifically, the operation of the polarization model detection section may be changed to any one of the operations in the above-described embodiments according to the number of polarization directions of a polarized image and polarization parameters acquired by the polarization parameter acquisition section. For example, in a case where the polarized image has one or more polarization directions, the operation of the first embodiment, which corresponds to pattern 1 in FIG. β or the operation of the second embodiment, which corresponds to pattern 2 in FIG. β is performed according to polarization parameters acquired by the polarization parameter acquisition section. Performing such a processing operation makes it possible to detect the polarization model according to various situations.

Moreover, the foregoing embodiments have been described on the assumption that the image processing device includes the polarized image acquisition section and the polarization parameter acquisition section. Alternatively, however, the polarized image acquisition section, the polarization parameter acquisition section, and the non-polarized image acquisition section in the polarization parameter acquisition section may be disposed separately from the image processing device.

8. Acquisition of Zenith Angle and Azimuth Angle

Figure 14:
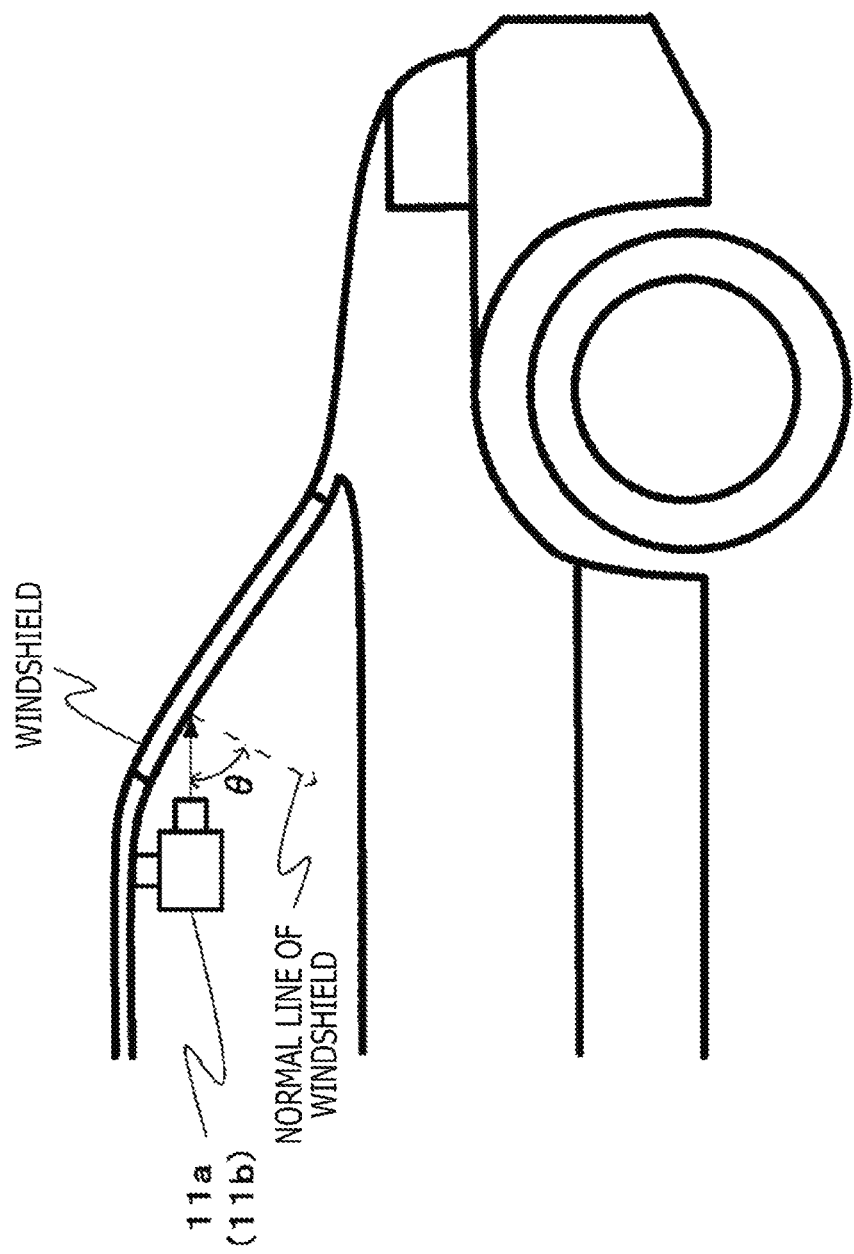
FIG. 14 is a diagram illustrating a case where a polarized image acquisition section is disposed in a vehicle in order to capture an image of the outside of the vehicle through a windshield.

The acquisition of the zenith angle will now be described. In a case where the positional relation between the target object and the polarized image acquisition section is obvious, it is assumed that the zenith angle is an angle based on geometric information regarding the target object and the polarized image acquisition section. FIG. 14 illustrates a case where the polarized image acquisition section is securely disposed, for example, in a vehicle in order to capture an image of the outside of the vehicle through a windshield. In this case, the positional relation between the polarized image acquisition section 11a (11b) and the windshield is obvious. Therefore, the zenith angle $\theta$ of the normal line of the position of viewpoint on the windshield as viewed from the polarized image acquisition section 11a (11b) is precalculated on the basis of geometric information indicative of the positional relation and is then stored in the information storage section 1231 depicted in FIG. 8.

Figure 15:
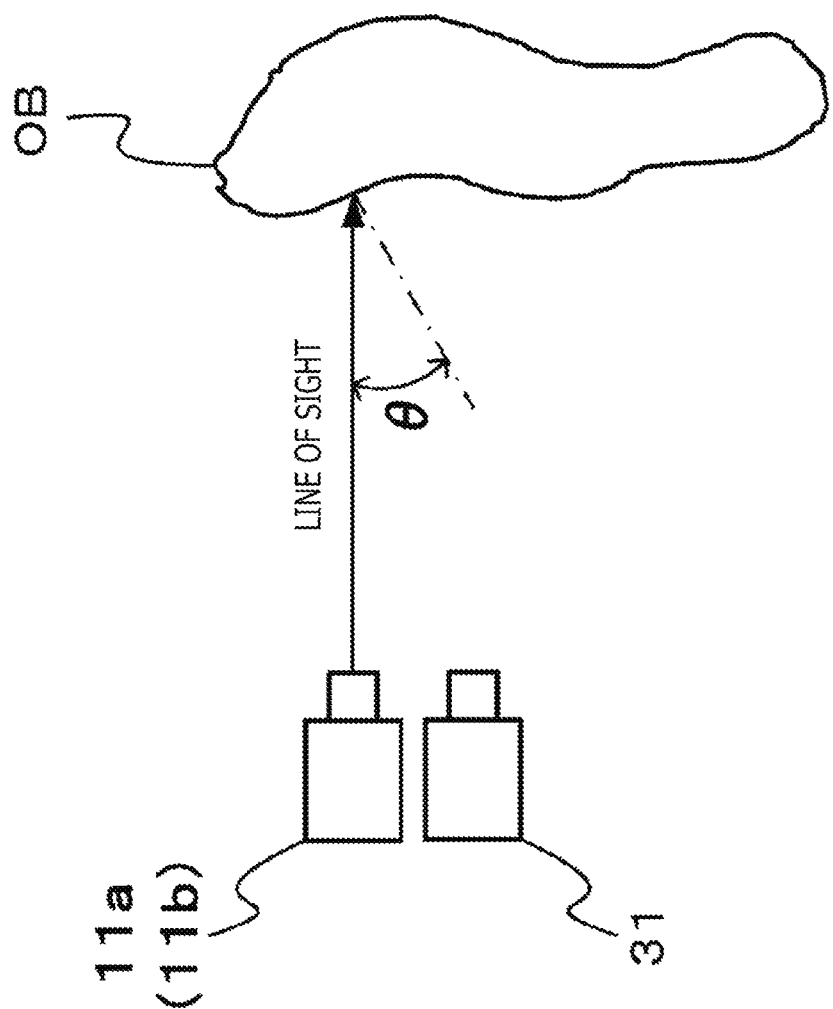
FIG. 15 is a diagram illustrating a case where a zenith angle is calculated based on a three-dimensional shape.

Further, the zenith angle may be an angle based on the three-dimensional shape of the target object. FIG. 15 illustrates a case where the zenith angle is calculated based on the three-dimensional shape. The three-dimensional shape of the target object OB is acquired by a three-dimensional shape acquisition section 31 that includes, for example, a ToF (Time Of Flight) sensor, a Structured light depth sensor, or a stereo camera. When the three-dimensional shape of the target object OB is obvious, it is possible to precalculate the zenith angle $\theta$ of the normal line of the position of viewpoint on the target object OB as viewed from the polarized image acquisition section 11a (11b). Therefore, the calculated zenith angle $\theta$ is stored in the information storage section 1231 depicted in FIG. 8.

Figure 16A:
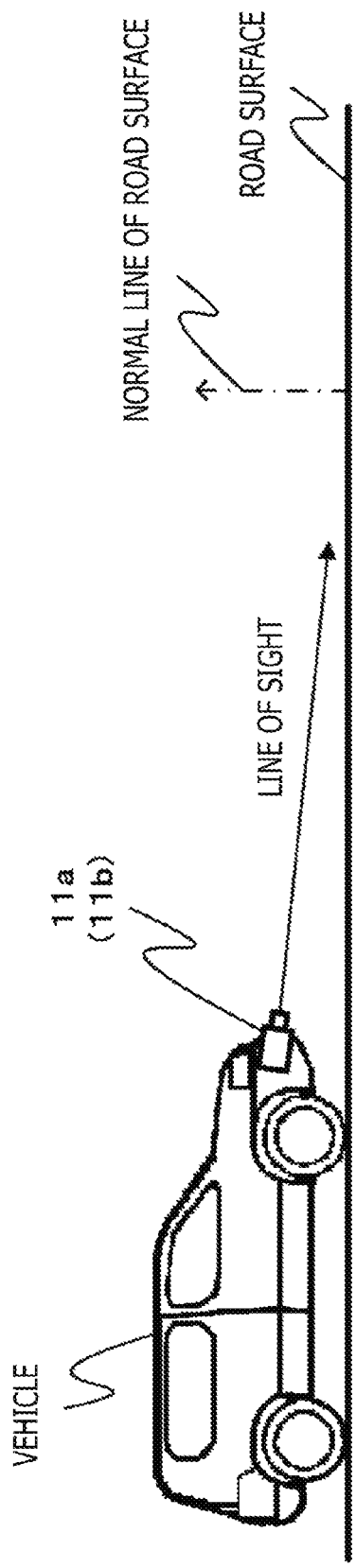
Figure 16B:
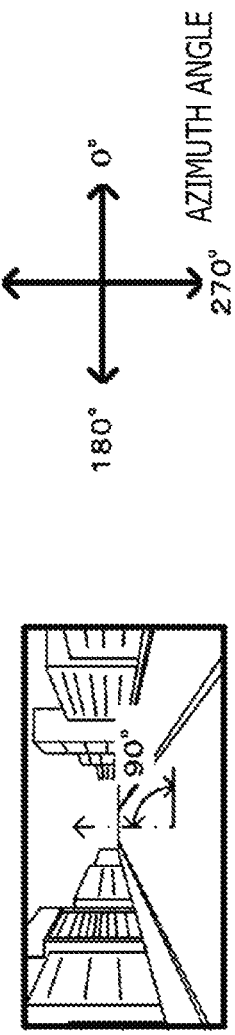

The acquisition of the azimuth angle (the phase of the polarization model) will now be described. It is assumed that the azimuth angle is an angle based on the geometric information regarding the target object and the polarized image acquisition section for acquiring a polarized image of the target object. For example, in a case where the shape of a target scene remains unchanged and the polarized image acquisition section is securely installed, the normal direction of the target object as viewed from the polarized image acquisition section remains unchanged. Therefore, the azimuth angle is known information at all times. Accordingly, the azimuth angle is calculated based on geometric information regarding the positional relation between the polarized image acquisition section and the target object, and then stored in the polarization model phase storage section 124 depicted in FIG. 10. FIGS. 16A and 16B illustrate a case where the polarized image acquisition section is disposed, for example, in a vehicle in order to capture an image of an area ahead of the vehicle. It should be noted that, depicted in FIG. 16A is the vehicle and a road surface, and depicted in FIG. 16B is a polarized image that is captured by the polarized image acquisition section 11a (11b) disposed in the vehicle. If it is assumed that the road surface is the target object and that the direction parallel to the road surface is a direction with an azimuth angle of 0 degrees, the normal line of the road surface is obvious, and the azimuth angle can be assumed to be approximately 90 degrees. Therefore, in a case where the road surface is the target object, the assumed azimuth angle is stored in the polarization model phase storage section 124 depicted in FIG. 10. Further, if it is assumed that the target object is a road alone, the normal line of the road remains unchanged and the azimuth angle is known. Therefore, light reflected from the surface of the road can be removed based on the polarization model that is detected by using the azimuth angle (phase) stored in the polarization model phase storage section 124. It should be noted that the positional relation between the polarized image acquisition section 11a (11b) and the windshield is obvious as depicted in FIG. 14. Consequently, the azimuth angle may be calculated based on the position of the polarized image acquisition section 11a (11b) and the planar direction of the windshield, and then stored in the polarization model phase storage section 124. In this case, for example, dashboard reflections in the windshield can be removed based on the polarization model that is detected by using the azimuth angle (phase) stored in the polarization model phase storage section 124.

Furthermore, the azimuth angle may be an angle based on the three-dimensional shape of the target object. As regards the three-dimensional shape of the target object, a depth map is acquired by using the above-mentioned three-dimensional shape acquisition section. The planar direction at each point of the target object can be calculated by differentiating the depth map. Therefore, the azimuth angle of the normal line is calculated based on the planar direction at each point and is stored in the polarization model phase storage section 124 depicted in FIG. 10. As described above, the polarization model can be detected from a polarized image having a small number of polarization directions by determining the normal line through the use of the depth map based on the shape of an object. Consequently, when reflection components are removed by using the detected polarization model, the brightness of the object can be determined accurately even in a case where the brightness is saturated due, for instance, to light source reflections in the object.

Moreover, the azimuth angle may be an angle based on the azimuth angle of a nearby location. FIG. 17 is a diagram illustrating a case where the azimuth angle is an angle based on the azimuth angle of a nearby location. For example, the polarized image acquisition section 11a is configured such that a first pixel group and a second pixel group are disposed adjacent to each other. The first pixel group includes polarization pixels having four different polarization directions. The second pixel group includes one polarization pixel and three non-polarization pixels. In this case, the first pixel group includes polarization pixels having four different polarization directions. Therefore, the polarization model for the first pixel group can be detected based on the brightnesses of the polarization pixels. Further, as the first and second pixel groups are adjacent to each other, the difference in the azimuth angle (phase) φ is small. Therefore, for example, the phase of the polarization model detected for the first pixel group may be regarded as the azimuth angle of the second pixel group and stored in the polarization model phase storage section 124 depicted in FIG. 10. Furthermore, the azimuth angle of the second pixel group may be calculated, for example, by performing interpolation based on the phase of the first pixel group, which is adjacent to both sides of the second pixel group.

Additionally, the azimuth angle may be specifiable by a user operation. More specifically, an azimuth angle input section may be incorporated in order to let the polarization model phase storage section 124 store the azimuth angle specified by the azimuth angle input section.

Figure 18:
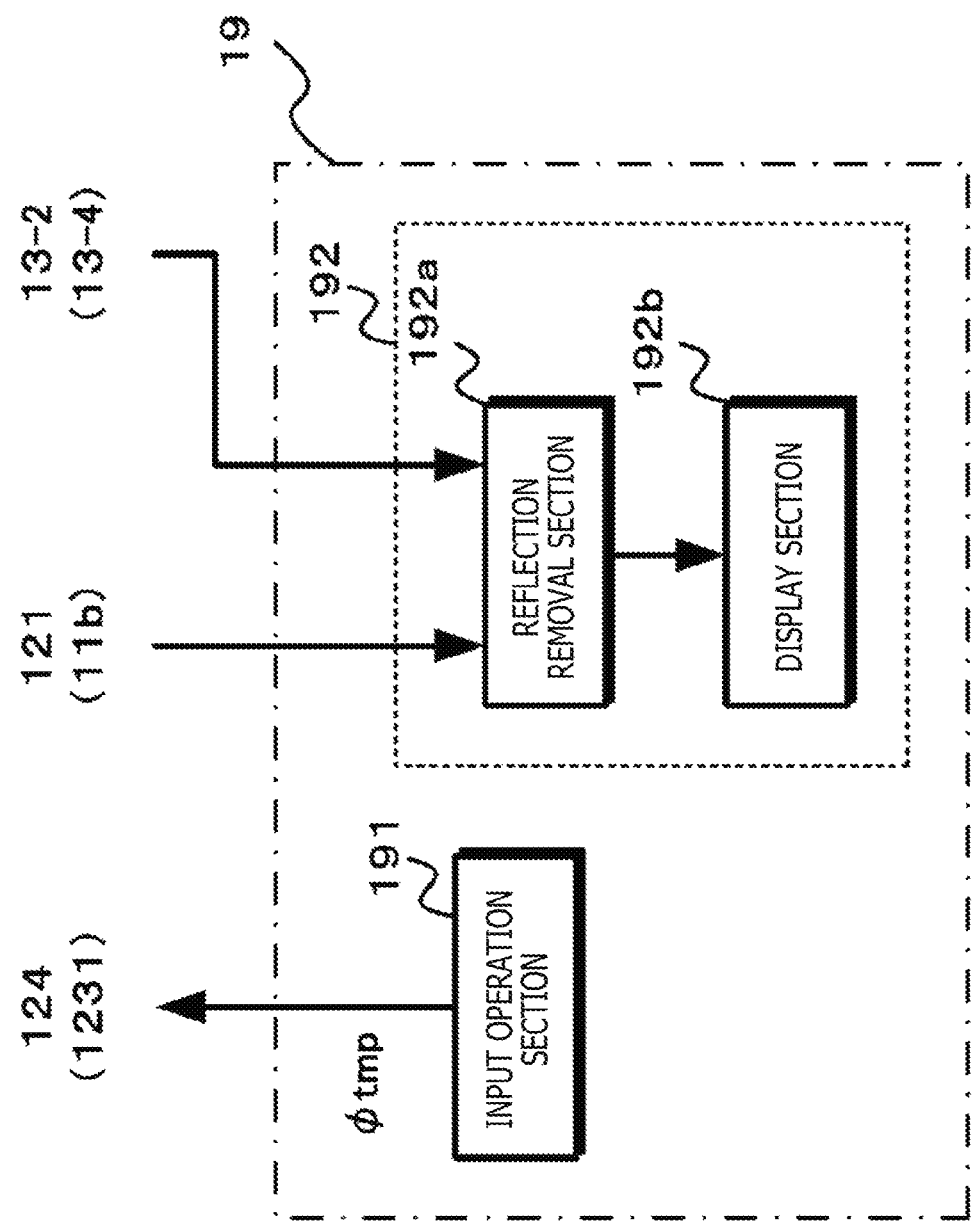
FIG. 18 is a diagram illustrating a configuration of an azimuth angle input section.
Figures 19A, 19B:
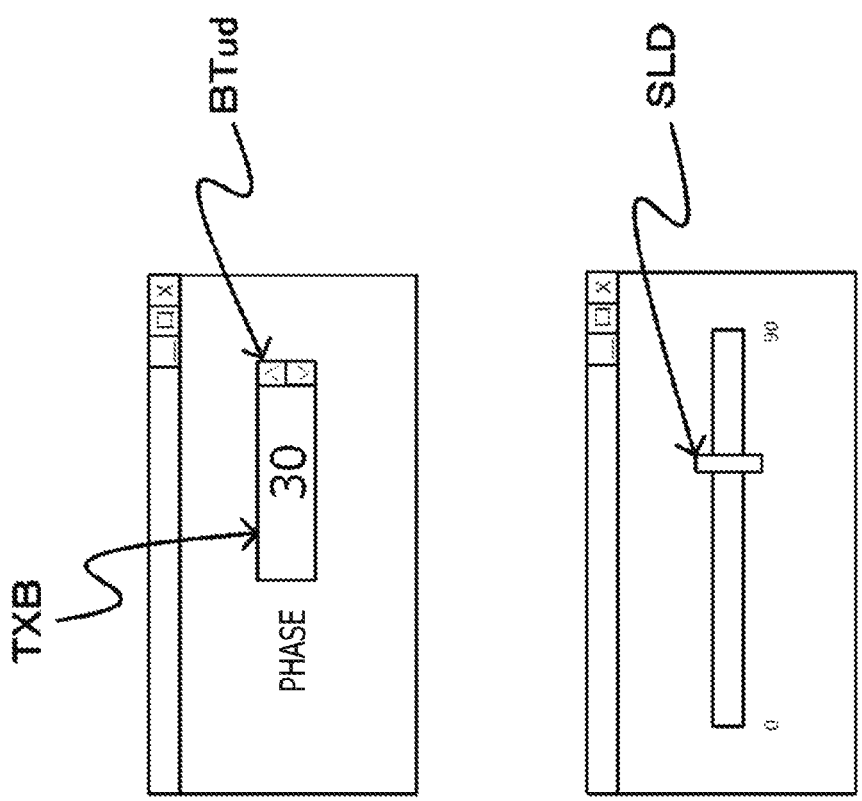
FIGS. 19A and 19B are set of diagrams illustrating an image of a GUI that makes it possible to specify the azimuth angle.

FIG. 18 illustrates a configuration of the azimuth angle input section. The azimuth angle input section 19 includes an input operation section 191 and an image presentation section 192. The input operation section 191 includes an operation dial capable of adjusting the value of the azimuth angle or a GUI capable of allowing the input operation section 191 and the image presentation section 192 to adjust the value of the azimuth angle. The input operation section 191 causes the polarization model phase storage section 124 to store the azimuth angle that is specified by a user through the use of the operation dial or the GUI. FIGS. 19A and 19B illustrate an image of the GUI that makes it possible to specify the azimuth angle. Depicted in FIG. 19A is a case where a text box is used. In this case, the azimuth angle inputted to the text box TXB is stored in the polarization model phase storage section 124 as the specified azimuth angle φtmp. Further, up and down arrow buttons BTud may be incorporated to increase or decrease the azimuth angle φtmp according to operations of the up and down arrow buttons BTud. Depicted in FIG. 19B is a case where a slider is incorporated. In this case, the azimuth angle corresponding to the position of the slider SLD is stored in the polarization model phase storage section 124 as the specified azimuth angle φtmp.

When the azimuth angle is stored in the polarization model phase storage section 124 as described above, it is possible, as described in conjunction with the second embodiment, to identify the polarization model from a non-polarized image, the azimuth angle (phase), and an image polarized in one or more polarization directions. However, in a case where a user-specified azimuth angle is different from the actual azimuth angle, a desired effect cannot be obtained even if the identified polarization model is used. For example, in a case where specular reflection components are to be removed based on the polarization model, the specular reflection components cannot be removed accurately if the user-specified azimuth angle is different from the actual azimuth angle. As such being the case, the image presentation section 192 includes a reflection removal section 192a and a display section 192b and displays an image obtained by a reflection removal process that is performed on the target object on the basis of the polarization model identified by using the user-specified azimuth angle φtmp. For example, amplitude changes in the polarization model represent specular reflection components. Therefore, the reflection removal section 192a removes the amplitude changes from a non-polarized image acquired by the non-polarized image acquisition section 121 and causes the display section 192b to display an image that is obtained by a process of removing the amplitude changes. Further, for example, the above-mentioned text box, up and down arrow buttons BTud, and slider may be displayed together with the image obtained by the process of removing the amplitude changes. As far as the result of amplitude change removal processing based on the polarization model identified by using a user operation display and a user-specified azimuth angle is displayed as described above, the correct azimuth angle can easily be stored in the polarization model phase storage section 124 by adjusting the azimuth angle in such a manner as to minimize the reflection components of an image presented by the image presentation section 192. Moreover, the reflection removal section 192a need not always be disposed in the azimuth angle input section 19. The reflection removal section 192a may alternatively be disposed independently of the azimuth angle input section 19.

Figure 20:
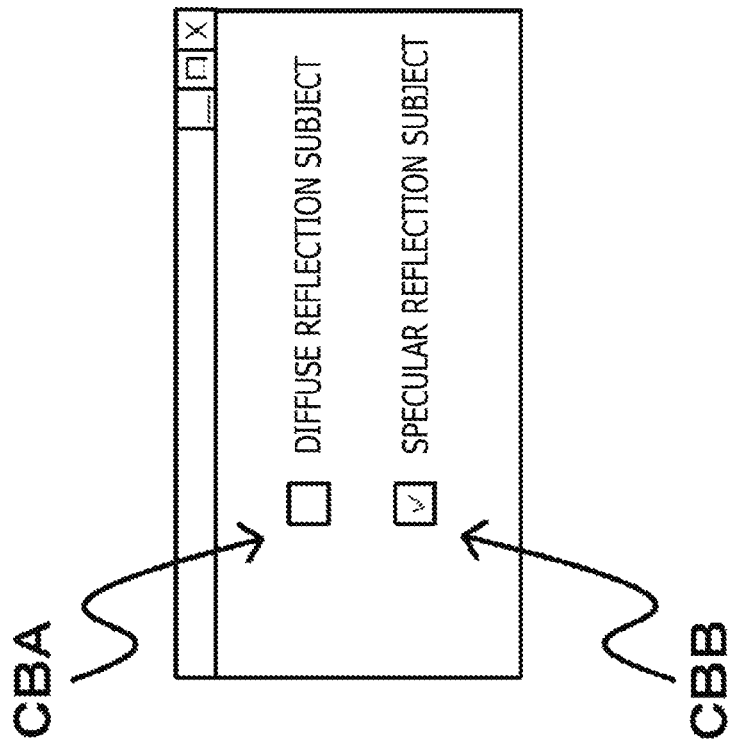

FIG. 20 illustrates an image of a GUI for inputting the reflectance property information. A checkbox CBA and a checkbox CBB are used for inputting the reflectance property information. The checkbox CBA selects diffuse reflection as the subject, and the checkbox CBB selects specular reflection as the subject. The reflectance property information is generated based on the result of selection made by one of the checkboxes and is stored in the information storage section 1231.

When the above-described processing is performed, the image processing device is able to store information necessary for polarization model detection.

9. Application Examples

The technology according to the present disclosure (the present technology) can be applied to various products. For example, the technology according to the present disclosure may be implemented as a device that is to be mounted in one of various types of mobile bodies such as automobiles, electric automobiles, hybrid electric automobiles, motorcycles, bicycles, personal mobility devices, airplanes, drones, ships, and robots.

Figure 21:
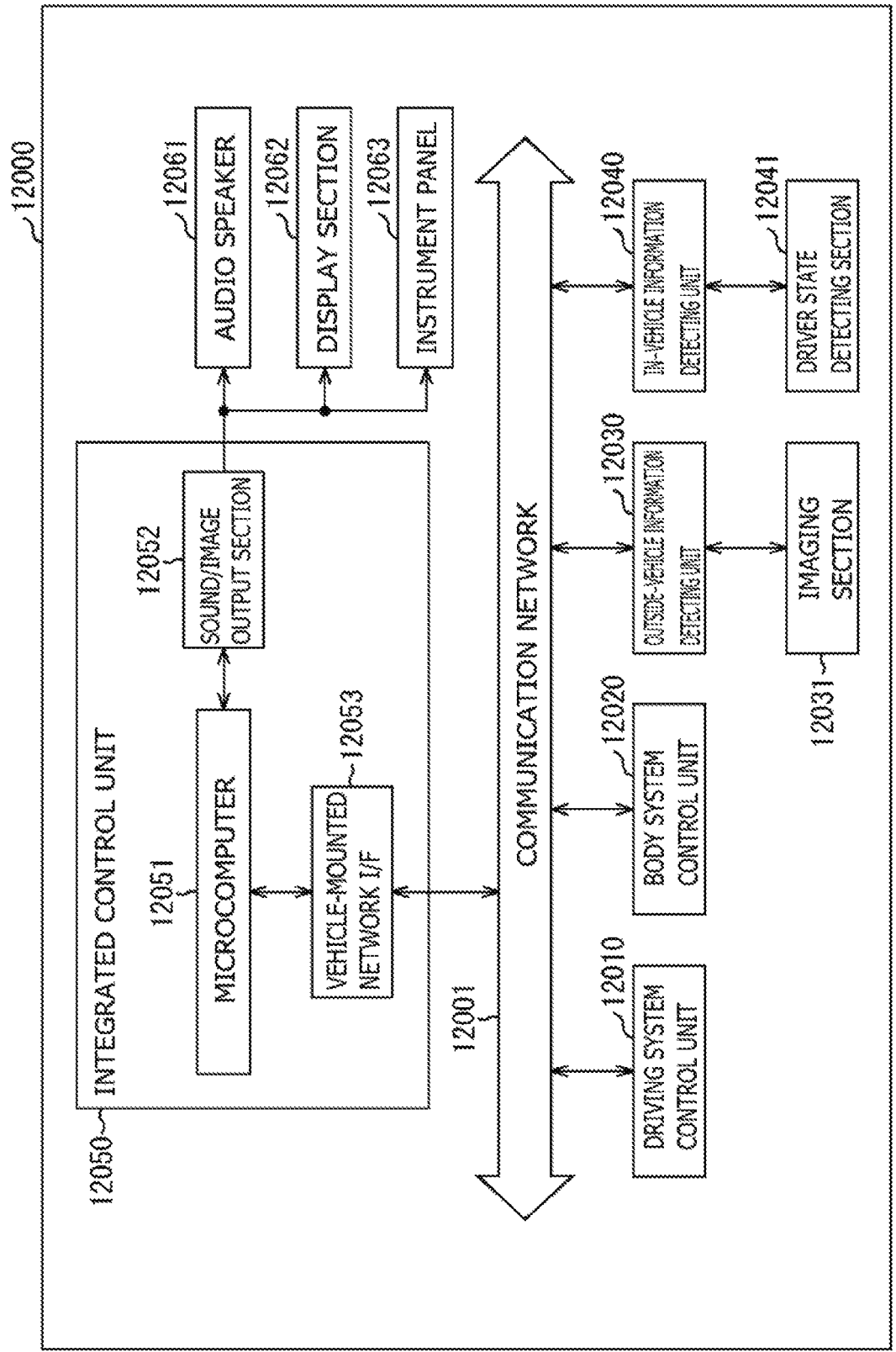

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

Figure 22:
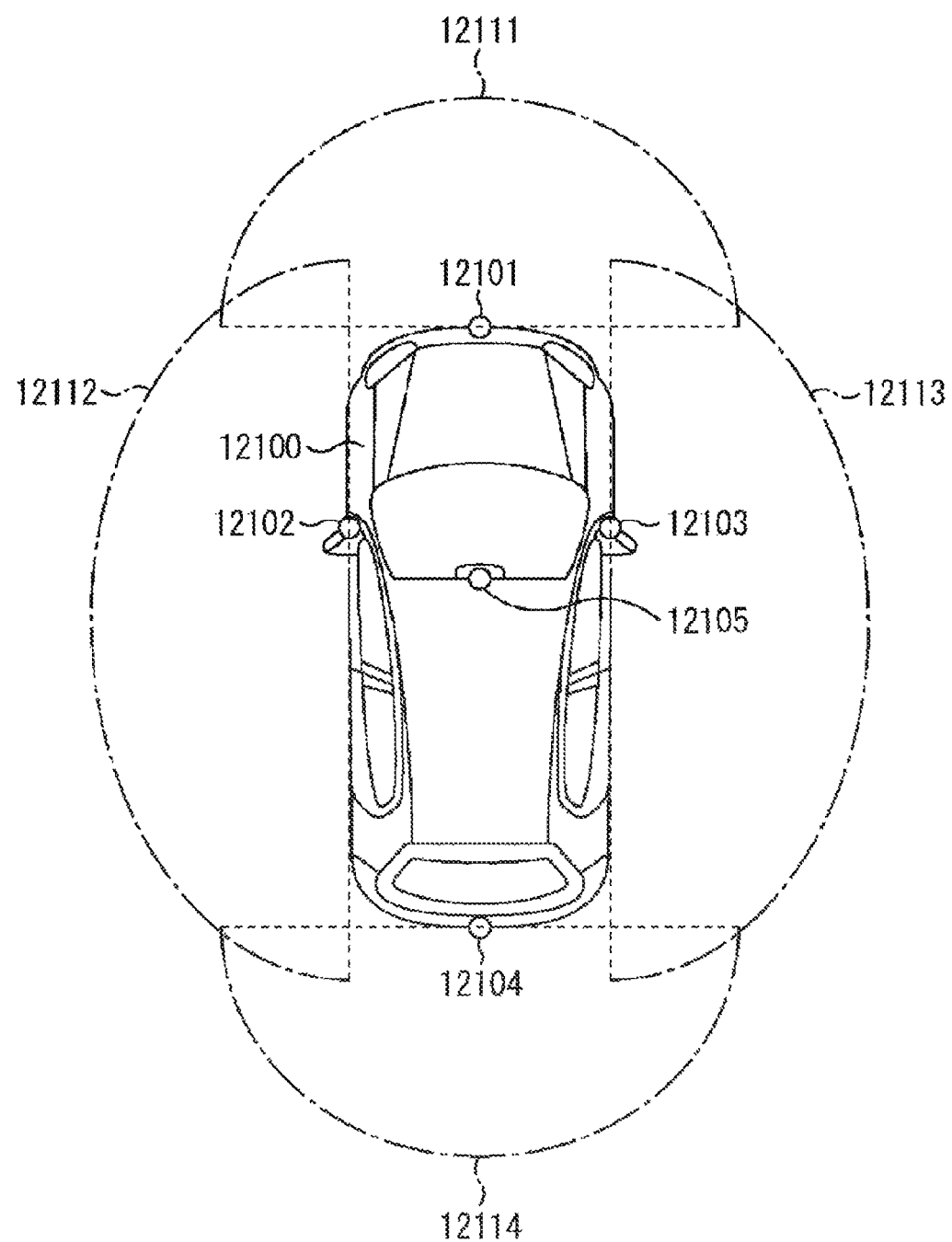

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above description relates to an example of the vehicle control system to which the technology according to the present disclosure is applicable. The technology according to the present disclosure is such that the polarized image acquisition section 11*a* and the non-polarized image acquisition section 121 in the polarization parameter information acquisition section, which are based on the technology according to the present disclosure, are applicable, for example, to the imaging section 12031, which is among the above-described elements. Further, the polarization parameter information acquisition section (except for the non-polarized image acquisition section 121) and the polarization model detection section, which are based on the technology according to the present disclosure, are applicable to the outside-vehicle information detecting unit 12030, which is among the above-described elements. As described above, when the technology according to the present disclosure is applied to the vehicle control system, it is possible, for example, to accurately remove reflections by using a detected polarization model, and thus, highly accurately acquire information necessary for reducing the fatigue of a vehicle driver and for automatic driving.

A series of processes described in the present specification can be performed by hardware, software, or a combination of both. When a process is to be performed by software, a program in which a processing sequence is recorded is installed in a memory of a computer built in dedicated hardware, and then executed. Alternatively, the program may be installed in a general-purpose computer capable of performing various processes and then executed.

For example, the program may be prerecorded on a hard disk or an SSD (Solid State Drive), which are used as a recording medium, or in a ROM (Read Only Memory). Alternatively, the program may be stored (recorded) temporarily or permanently on a flexible disk, a CD-ROM (Compact Disc Read Only Memory), an MO (Magneto optical) disk, a DVD (Digital Versatile Disc), a BD (Blu-Ray Disc (registered trademark)), a magnetic disk, a semiconductor memory card, or other removable recording media. Such a removable recording medium may be supplied as what is generally called package software.

Further, as an alternative to installing the program on a computer from a removable recording medium, the program may be transferred from a download site to the computer in a wireless or wired manner via a network such as a LAN (Local Area Network) or the Internet. In such an instance, the computer is able to receive the program transferred in such a manner and install it on a built-in hard disk or other recording media.

The advantageous effects described in the present specification are merely illustrative and not restrictive. Advantageous effects not described in the present specification may additionally be provided. Further, the interpretation of the present technology is not limited to those described in conjunction with the foregoing embodiments. The embodiments of the present technology disclose the present technology in an illustrative manner. It is to be understood that the embodiments may be modified or substituted by those skilled in the art without departing from the spirit and scope of the present technology. That is to say, the spirit of the present technology should be determined in consideration of the appended claims.

Further, the image processing device according to the present technology may also adopt the following configurations.

(1)
An image processing device including:
a polarization model detection section that detects a polarization model indicative of polarization properties of a target object on the basis of a polarized image of the target object having one or more polarization directions and a polarization parameter acquired by a polarization parameter acquisition section.

(2)
The image processing device as described in (1), in which based on the number of polarization directions of the polarized image, the polarization parameter acquisition section includes one or more combinations of a non-polarized image acquisition section, an information storage section, and a phase storage section, the non-polarized image acquisition section acquiring a non-polarized image of the target object, the information storage section storing property information and a zenith angle of a normal line regarding the target object, the phase storage section storing an azimuth angle of the normal line of the target object.

(3)
The image processing device as described in (2), in which a sensitivity correction section is additionally included in a case where the non-polarized image acquisition section is disposed in the polarization parameter acquisition section, the sensitivity correction section correcting the non-polarized image acquired by the non-polarized image acquisition section for sensitivity of the polarized image.

(4)
The image processing device as described in (2) or (3), in which
the polarization parameter acquisition section acquires a polarization parameter indicative of amplitude of the polarization model, on the basis of the non-polarized image corrected by the sensitivity correction section and the property information stored in the information storage section.

(5)
The image processing device as described in (2), in which the non-polarized image acquisition section acquires a non-polarized image by capturing an image without using a polarizer in a polarized image acquisition section configured to acquire the polarized image of the target object.

(6)
The image processing device as described in (5), in which the polarized image acquisition section for acquiring the polarized image of the target object includes polarization pixels from which a polarizer is detachable or polarization pixels with the polarizer and non-polarization pixels without the polarizer.

(7)
The image processing device as described in (2), in which the zenith angle stored in the information storage section is an angle based on geometric information regarding the target object and a polarized image acquisition section for acquiring a polarized image of the target object.

(8)
The image processing device as described in (2), in which the zenith angle stored in the information storage section is an angle based on a three-dimensional shape of the target object.

(9)
The image processing device as described in (2), in which the information storage section stores reflectance property information indicating whether the polarized image represents information regarding a specular reflection subject or a diffuse reflection subject.

(10)
The image processing device as described in (2), in which the azimuth angle stored in the phase storage section is an angle based on geometric information regarding the target object and a polarized image acquisition section for acquiring a polarized image of the target object.

(11)
The image processing device as described in (2), in which the azimuth angle stored in the phase storage section is an angle based on a three-dimensional shape of the target object.

(12)
The image processing device as described in (2), in which the azimuth angle stored in the phase storage section is an angle based on an azimuth angle of a nearby location calculated on the basis of an image polarized in three or more polarization directions.

(13)
The image processing device as described in (2) further including:
an azimuth angle input section for setting the azimuth angle, in which
the azimuth angle input section causes the phase storage section to store an azimuth angle based on a user operation and uses the polarization model detected based on the azimuth angle stored in the phase storage section in order to display an image obtained by removing reflection components from the polarized image.

(14)
The image processing device as described in any one of (1) to (13) further including:
a saturation detection section for detecting whether the polarized image is saturated, in which
the polarization model detection section detects the polarization model on the basis of the polarized image detected by the saturation detection section as being unsaturated and the polarization parameter acquired by the polarization parameter acquisition section.

(15)
The image processing device as described in any one of (1) to (14), in which
the polarization model detection section changes operation for polarization model detection according to the number of polarization directions of the polarized image and the polarization parameter acquired by the polarization parameter acquisition section.

(16) The image processing device as described in any one of (1) to (15) further including:
the polarization parameter acquisition section or the polarized image acquisition section for acquiring the polarized image of the target object.

(17) The image processing device as described in any one of (1) to (16) further including:
a reflection removal section that removes reflection components from an image of the target object on the basis of the polarized image of the target object and the polarization model detected by the polarization model detection section.

INDUSTRIAL APPLICABILITY

The image processing device, image processing method, and program according to the present technology detect a polarization model indicative of the polarization properties of a target object, on the basis of a polarized image of the target object having one or more polarization directions and a polarization parameter acquired by the polarization parameter acquisition section. Therefore, even in a case where an image polarized in three or more polarization directions cannot be acquired, the image processing device, image processing method, and program according to the present technology are able to detect the polarization properties of the target object, and thus suitable, for example, for equipment that uses images subjected to a reflection removal process or various other processes based on a polarization model.

REFERENCE SIGNS LIST 10-1, 10-2, 10-3, 10-4, 10-5 . . . Image processing device
11a, 11b, 15 . . . Polarized image acquisition section
12-1, 12-2, 12-3, 12-4, 17 . . . Polarization parameter information acquisition section
13-1, 13-2, 13-3, 13-4, 18 . . . Polarization model detection section
16 . . . Saturation detection section
19 . . . Azimuth angle input section
31 . . . Three-dimensional shape acquisition section
111 . . . Camera block
112 . . . Polarizing plate
113 . . . Image sensor
114 . . . Polarizing element
121 . . . Non-polarized image acquisition section
122 . . . Sensitivity correction section
123 . . . Polarization model amplitude detection section
124 . . . Polarization model phase storage section
191 . . . Input operation section
192 . . . Image presentation section
192a . . . Reflection removal section
192b . . . Display section
1231 . . . Information storage section
1232 . . . Degree-of-polarization calculation section
1233 . . . Amplitude detection section

The invention claimed is:

1. An image processing device, comprising:
a polarization parameter acquisition circuitry includes, based on a number of polarization directions of a polarized image of a target object, at least one combination of a non-polarized image acquisition circuitry, an information storage circuitry, and a phase storage circuitry, wherein
the polarization parameter acquisition circuitry is configured to acquire a polarization parameter,
the non-polarized image acquisition circuitry is configured to acquire a non-polarized image of the target object,
the information storage circuitry is configured to store property information and a zenith angle of a normal line regarding the target object, and
the phase storage circuitry is configured to store an azimuth angle of the normal line of the target object; and
a polarization model detection circuitry configured to detect a polarization model, indicative of polarization properties of the target object, based on the polarized image of the target object and the acquired polarization parameter.

2. The image processing device according to claim 1, wherein
the polarization parameter acquisition circuitry further includes a sensitivity correction circuitry in a case where the polarization parameter acquisition circuitry includes the non-polarized image acquisition circuitry, and
the sensitivity correction circuitry is configured to correct the acquired non-polarized image for sensitivity of the polarized image.

3. The image processing device according to claim 2, wherein
the polarization parameter indicates an amplitude of the polarization model, and
the polarization parameter acquisition circuitry is further configured to acquire the polarization parameter, indicative of the amplitude of the polarization model, based on the corrected non-polarized image and the stored property information.

4. The image processing device according to claim 1, further comprising a polarized image acquisition circuitry configured to acquire the polarized image of the target object, wherein
the non-polarized image acquisition circuitry is further configured to acquire the non-polarized image by capture of an image without using a polarizer in the polarized image acquisition circuitry.

5. The image processing device according to claim 4, wherein
the polarized image acquisition circuitry includes polarization pixels from which a polarizer is detachable or polarization pixels with the polarizer and non-polarization pixels without the polarizer.

6. The image processing device according to claim 1, further comprising a polarized image acquisition circuitry configured to acquire the polarized image of the target object, wherein
the zenith angle stored in the information storage circuitry is an angle based on geometric information regarding the target object.

7. The image processing device according to claim 1, wherein
the zenith angle stored in the information storage circuitry is an angle based on a three-dimensional shape of the target object.

8. The image processing device according to claim 1, wherein the information storage circuitry is further configured to store reflectance property information indicating whether the polarized image represents information regarding a specular reflection subject or a diffuse reflection subject.

9. The image processing device according to claim 1, further comprising a polarized image acquisition circuitry configured to acquire the polarized image of the target object, wherein
the azimuth angle stored in the phase storage circuitry is an angle based on geometric information regarding the target object.

10. The image processing device according to claim 1, wherein
the azimuth angle stored in the phase storage circuitry is an angle based on a three-dimensional shape of the target object.

11. The image processing device according to claim 1, wherein
the azimuth angle stored in the phase storage circuitry is an angle based on an azimuth angle of a nearby location, and
the azimuth angle of the nearby location is calculated based on an image polarized in at least three polarization directions.

12. The image processing device according to claim 1, further comprising an azimuth angle input circuitry configured to:
set the azimuth angle
control the phase storage circuitry to store the azimuth angle based on a user operation; and
display a specific image by removal of reflection components from the polarized image, wherein
the detection of the polarization model is based on the stored azimuth angle, and
the specific image is displayed based on the polarization model.

13. The image processing device according to claim 1, further comprising a saturation detection circuitry configured to detect whether the polarized image is saturated, wherein
the polarization model detection circuitry is further configured to detect the polarization model based on the detection of the polarized image as being unsaturated and the acquired polarization parameter.

14. The image processing device according to claim 1, wherein
the polarization model detection circuitry is further configured to change operation for polarization model detection based on the number of polarization directions of the polarized image and the acquired polarization parameter.

15. The image processing device according to claim 1, further comprising a polarized image acquisition circuitry configured to acquire the polarized image of the target object.

16. The image processing device according to claim 1, further comprising a reflection removal circuitry configured to remove reflection components from an image of the target object based on the polarized image of the target object and the detected polarization model.

17. An image processing method, comprising:
acquiring, by a polarization parameter acquisition circuitry, a polarization parameter,
wherein the polarization parameter acquisition circuitry includes, based on a number of polarization directions of a polarized image of a target object, at least one combination of a non-polarized image acquisition circuitry, an information storage circuitry, and a phase storage circuitry;
acquiring, by the non-polarized image acquisition circuitry, a non-polarized image of the target object;
storing, by the information storage circuitry, property information and a zenith angle of a normal line regarding the target object;
storing, by the phase storage circuitry, an azimuth angle of the normal line of the target object; and
detecting, by a polarization model detection circuitry, a polarization model indicative of polarization properties of the target object based on the polarized image of the target object and the acquired polarization parameter.

18. A non-transitory computer-readable medium having stored thereon computer-executable instructions, which when executed by a computer of an image processing device, cause the computer to execute operations, the operations comprising:
controlling a polarization parameter acquisition circuitry of the image processing device to acquire a polarization parameter, wherein
the polarization parameter acquisition circuitry includes, based on a number of polarization directions of a polarized image of a target object, at least one combination of a non-polarized image acquisition circuitry, an information storage circuitry, and a phase storage circuitry;
controlling the non-polarized image acquisition circuitry to acquire a non-polarized image of the target object;
controlling the information storage circuitry to store property information and a zenith angle of a normal line regarding the target object;
controlling the phase storage circuitry to store an azimuth angle of the normal line of the target object; and
detecting a polarization model, indicative of polarization properties of the target object, based on the polarized image of the target object and the acquired polarization parameter.

* * * * *